United States Patent
Chung et al.

(10) Patent No.: US 11,874,911 B2
(45) Date of Patent: Jan. 16, 2024

(54) PRIVACY PRESERVING FACE-BASED AUTHENTICATION

(71) Applicant: Georgia Tech Research Corporation, Atlanta, GA (US)

(72) Inventors: Pak Ho Chung, Atlanta, GA (US); Wenke Lee, Atlanta, GA (US); Erkam Uzun, Atlanta, GA (US); Carter Yagemann, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 0 days.

(21) Appl. No.: 18/050,561

(22) Filed: Oct. 28, 2022

(65) Prior Publication Data
US 2023/0081988 A1    Mar. 16, 2023

Related U.S. Application Data

(63) Continuation of application No. 17/046,536, filed as application No. PCT/US2019/027233 on Apr. 12, 2019, now Pat. No. 11,494,476.
(Continued)

(51) Int. Cl.
G06F 21/32    (2013.01)
G06F 21/62    (2013.01)
H04L 9/08    (2006.01)

(52) U.S. Cl.
CPC ............ G06F 21/32 (2013.01); G06F 21/62 (2013.01); H04L 9/0861 (2013.01)

(58) Field of Classification Search
CPC ......... G06F 21/32; G06F 21/62; H04L 9/0861
See application file for complete search history.

(56) References Cited

U.S. PATENT DOCUMENTS

2011/0208688 A1    8/2011    Ivanov et al.
2015/0347734 A1*   12/2015   Beigi .................... H04L 9/3268
                                                   726/28
(Continued)

FOREIGN PATENT DOCUMENTS

WO    2022015948 A1    1/2022
WO    2013129580 A1    10/2022

OTHER PUBLICATIONS

Schroff et al. "FaceNet: A Unified Embedding for Face Recognition and Clustering." Cornell University Library/ Computer Science/ Computer Vision and Pattern Recognition, Jun. 17, 2015. Retrieved from https://arxiv.org/ads/1503.03832 on Jun. 20, 2019.
(Continued)

*Primary Examiner* — Han Yang
(74) *Attorney, Agent, or Firm* — Thomas | Horstemeyer, LLP

(57) ABSTRACT

Example systems and methods for biometric authentication that can bridge fuzzy extractors with deep learning and achieve the goals of preserving privacy and providing recoverability from zero are disclosed. Embeddings comprising a face or speaker embedding in a non-Hamming distance space can be processed to create a personal reliable bit map and a reliable locality-sensitive hash (LSH) for mapping the non-Hamming distance space to a Hamming distance space. A fuzzy extractor can be applied to create metadata that can be stored on a computing device. A secret can be recovered from the metadata and can be used for identification.

20 Claims, 15 Drawing Sheets

Related U.S. Application Data

(60) Provisional application No. 62/656,502, filed on Apr. 12, 2018.

(56) References Cited

U.S. PATENT DOCUMENTS

2016/0373440 A1    12/2016    Mather et al.
2019/0020472 A1    1/2019     Cho et al.

OTHER PUBLICATIONS

International Search Report and Written Opinion dated Jul. 5, 2019 in co-pending PCT Application No. PCT/US2019/027233.
Canetti, "Reusable Fuzzy Extractors for Low-Entropy Distributions", DOI: 10.1007/978-3-662-49890-3_5, Advances in Cryptology—EUROCRYPT 2016, pp. 117-146, 30 pages (Year:2016).

* cited by examiner

| Par. | Description | Face | Voice |
|---|---|---|---|
| $L_{lsh}$ | Length of LSH inputs of FE (bits) | 256 | 256 |
| $Pr_{msk}$ | Masking prob. of unreliable bits | 0.9 | 0.9 |
| $S_{scan}$ | Num. of biometric scans per-person | 9 | 9 |
| $L_{sub}$ | Length of randomly-subsampled LSH inputs of FE (bits) | 64 | 64 |
| $HD_{thr}$ | Hamming distance threshold of LSH inputs to unlock locker in FE (bits) | 7 | 2 |

FIG. 10

| Dataset | Baseline Sys. | $ED_{thr}$ | FRR / FAR(%) |
|---|---|---|---|
| clean Custom | FaceNet | 0.45 | 0.00 / 0.0000 |
| clean YTF | FaceNet | 0.45 | 31.0 / 0.0000 |
| clean YTF | FaceNet | 0.65 | 2.95 / 0.0007 |
| LibriSpeech | DeepSpeaker | 9.70 | 5.70 / 6.3100 |

FIG. 11

|  | clean YTF | Libri Speech | clean YTF+ LibriSpeech |
| --- | --- | --- | --- |
| Scans | single | multi | multi |
| Enr. time(sec.) | 6.2E-1 | 8.7E-3 | 6.2E-1 |
| Rec. time(sec.) | 7.5E-2 | 1.2E-3 | 7.5E-2 |
| # of FE masks(k) | 1.2E+4 | 8.1E+1 | 1.2E+4 |
| FRR (%) | 0.16 | 1.52 | 1.68 |
| FAR (%) | 0.00 | 0.195 | 0.00 |
| $F_k(0)^{-1}$ (1 in) | 1.68E+7 | 5.1E+2 | 8.62E+9 |

FRR and FAR are empirical error rates; $F_k(0)^{-1}$ is the theoretical bound of an attacker's capability to unlock *one* FE with $k$ masks/lockers.

FIG. 12

| $L_{lsh}$ (bits) | FRR/FAR (%) | $HD_{thr}$ (bits) | N (bits) | $\Delta \mathcal{P}$ (x$10^{-3}$) |
|---|---|---|---|---|
| 128 | 6.5 / 0 | 18 | 35 | 4.12 |
| 192 | 5.0 / 0 | 27 | 34 | 3.76 |
| 256 | 2.5 / 0 | 34 | 32 | 2.54 |
| 320 | 3.0 / 0 | 47 | 27 | 3.08 |

FIG. 13

| $Pr_{msk}$ | $L_{msk}$ | FRR/FAR(%) | $HD_{thr}$ | N | $\Delta \mathcal{P}$(x$10^{-3}$) |
|---|---|---|---|---|---|
| 0.0 | 0 | 2.5 / 0 | 34 | 32 | 2.54 |
| 0.1 | 0 | 1.5 / 0 | 37 | 31 | 4.27 |
| 0.3 | 10 | 6.0 / 0 | 25 | 28 | 4.27 |
| 0.5 | 19 | 1.5 / 0 | 22 | 24 | 3.52 |
| 0.7 | 30 | 0.0 / 0 | 18 | 24 | 3.06 |
| 0.9 | 46 | 0.0 / 0 | 15 | 25 | 3.27 |

FIG. 14

| $S_{sam}$ | $L_{msk}$ | FRR/FAR(%) | $HD_{thr}$ | N | $\Delta \mathcal{P}$(x$10^{-3}$) |
|---|---|---|---|---|---|
| 3 | 28 | 0.0 / 0 | 30 | 30 | 3.84 |
| 6 | 42 | 0.5 / 0 | 19 | 24 | 4.03 |
| 9 | 46 | 0.0 / 0 | 15 | 25 | 3.27 |

FIG. 15

| $L_{sub}$ | $\mu$ | $\sigma$ | N | $\Delta\mathcal{P}(\times 10^{-3})$ |
|---|---|---|---|---|
| 32 | 0.427 | 0.134 | 13 | 11.2 |
| 48 | 0.437 | 0.116 | 18 | 9.17 |
| 64 | 0.441 | 0.116 | 18 | 7.14 |
| 80 | 0.431 | 0.111 | 19 | 10.7 |
| 96 | 0.440 | 0.110 | 20 | 7.18 |
| 112 | 0.444 | 0.107 | 21 | 6.11 |
| 128 | 0.442 | 0.107 | 21 | 6.31 |

FIG. 16

| $HD_{thr}$ (bits) | Enr/Rec exec.(sec) | num. of FE masks | FE FRR/FAR(%) |
|---|---|---|---|
| 0 | 5.0E-4 / 1.0E-4 | 1.1E+1 | 3.0 / 0.00 |
| 1 | 1.1E-3 / 2.0E-4 | 3.0E+1 | 1.0 / 0.00 |
| 2 | 2.9E-3 / 4.0E-4 | 8.1E+1 | 0.0 / 0.00 |
| 3 | 7.7E-3 / 1.0E-3 | 2.2E+2 | 0.5 / 0.00 |
| 4 | 2.1E-2 / 2.5E-3 | 6.0E+2 | 0.0 / 0.00 |
| 5 | 6.8E-2 / 8.2E-3 | 1.6E+3 | 0.0 / 0.05 |
| 6 | 2.1E-1 / 2.5E-2 | 4.4E+3 | 0.0 / 0.11 |
| 7 | 6.2E-1 / 7.5E-2 | 1.2E+4 | 0.0 / 0.00 |
| 8 | 1.7E+0 / 2.0E-1 | 3.3E+4 | 0.0 / 0.42 |
| 9 | 4.7E+0 / 5.7E-1 | 8.9E+4 | 0.0 / 0.47 |
| 10 | 1.3E+1 / 1.6E+0 | 2.4E+5 | 0.0 / 0.87 |
| 11 | 3.6E+1 / 4.3E+0 | 6.6E+5 | 0.0 / 1.50 |
| 12 | 9.5E+1 / 1.1E+1 | 1.8E+6 | 0.0 / 2.29 |

FIG. 17

| Trials | 1-LSH FRR/FAR(%) | 2-LSH FRR/FAR(%) | 3-LSH FRR/FAR(%) |
|---|---|---|---|
| 1 | 39.3/1.30 | 24.1/0.12 | 18.2/0.09 |
| 2 | 19.1/2.02 | 8.04/0.17 | 4.78/0.15 |
| 3 | 9.77/2.22 | 2.82/0.28 | 1.52/0.20 |

FIG. 18

PRIVACY PRESERVING FACE-BASED AUTHENTICATION

CROSS-REFERENCE TO RELATED APPLICATIONS

This application is a continuation application that claims the benefit of and priority to U.S. Non-Provisional Application No. 17/046,536 entitled "Privacy Preserving Face-Based Authentication" filed on Oct. 9, 2020, which claims the benefit of and priority to National Stage of International Application No. PCT/US2019/027233, filed on Apr. 12, 2019, which claims the benefit of and priority to U.S. Provisional Patent Application No. 62/656,502 entitled "Privacy Preserving Face-Based Authentication" filed on Apr. 12, 2018, which are expressly incorporated by reference as if fully set forth herein in their entireties.

BACKGROUND

Biometric authentication is becoming increasingly popular, in part because biometric features are difficult to lose and easy to measure thanks to the widespread adoption of smartphones. This brings challenges, such as the need for preventing replay and protecting user privacy. Keeping an enrolled model on the user's device can be problematic because this approach can bind authentication to a specific device, resulting in two serious drawbacks. The first is that a user has to carry his enrolled device. The second drawback is that recovery, such as when the device is lost or needs to be replaced, is often by non-biometric means such as what the user knows (e.g., password). Additionally, sending biometric data across a network, e.g., for liveness detection, can raise privacy concerns. Therefore, a privacy preserving biometric authentication process is needed that can respect privacy, resist theft, and enable recovery solely with biometrics.

SUMMARY

Embodiments of the present disclosure are related to systems, methods, and non-transitory computer-readable mediums for biometric-based user identification, enrollment, authentication, and recovery.

In one embodiment, among others, a system for biometric-based user identification comprises a client device with a processor and an application executed by the processor. The application causes the client device to at least initiate generation of an embedding comprising a biometric data embedding in a non-Hamming distance space and process the embedding to create a processed embedding and at least one operator that can be used for mapping the non-Hamming distance space to a Hamming distance space. In some embodiments, the non-Hamming distance space is a Euclidean space.

In some embodiments, the application further causes the client device to start an enrollment session to enroll a user, and to create a set of masks and a set of lockers based on using the at least one operator and a computational reusable fuzzy extractor, where at least one of: a secret or a cryptographic key is encrypted in at least one of the set of lockers. The application further causes the client device to send metadata to a computing device over a network, the metadata comprising the set of lockers, the set of masks, and a personal reliable bit map. The at least one operator comprises Locality Sensitive Hashes (LSHs) or a different error correcting mechanism.

The application also further causes the client device to generate at least one of: a secret or a cryptographic key, and send at least one of: the at least one of the secret or the cryptographic key, or a second cryptographic key to a computing device over a network. The application further causes the client device to start an authentication session to verify the at least one of: the secret or the cryptographic key, and determine whether applying a set of masks to the processed embedding extracts the at least one of: the secret or the cryptographic key, wherein the at least one of: the secret or the cryptographic key is encrypted in at least one of a set of lockers, wherein the set of masks and the set of lockers are based on using a computational reusable fuzzy extractor and the at least one operator.

The application further causes the client device to obtain a message sent by the computing device, wherein at least a portion of the message comprises an authentication data created using the at least one of: the secret or the cryptographic key, and in response to determining that applying the set of masks to the processed embedding extracts the at least one of: the secret or the cryptographic key, generate a response using the at least one of: the secret or the cryptographic key.

The application further causes the client device to start a recovery session to replace the at least one of: the secret or the cryptographic key, create a new personal reliable bit map, a new set of masks and a new set of lockers, wherein the at least one of: the secret or the cryptographic key is encrypted in at least one of the set of lockers, wherein the new set of masks and the new set of lockers are based on using the at least one operator and the computational reusable fuzzy extractor, and send the new set of masks, the new set of lockers and the new personal reliable bit map to the computing device over the network.

The application further causes the client device to in response to receiving a request to perform a liveness challenge, capture at least one of a video or a voice, and wherein the embedding is based on the at least one of the video or the voice. The application further causes the client device to perform a text extraction on the at least one of the video or the voice, and send the response to a computing device over a network for determining whether the response matches with the liveness challenge and determining whether the response arrives to the computing device within a defined threshold of time, wherein the response comprises the text extraction.

In another embodiment, among others, a method for biometric-based user identification, comprises initiating generation of an embedding comprising a biometric data embedding in a non-Hamming distance space, and processing the embedding to create a processed embedding and at least one operator that can be used for mapping the non-Hamming distance space to a Hamming distance space. The method also comprises creating a set of masks and a set of lockers based on using the at least one operator and a computational reusable fuzzy extractor, wherein at least one of: a secret or a cryptographic key is encrypted in at least one of the set of lockers.

In another embodiment, among others, A non-transitory computer-readable medium embodying a program executable for biometric-based user identification on a client device, wherein the program, when executed, causes the client device to at least: initiate generation of an embedding comprising a biometric data embedding in a non-Hamming distance space, and process the embedding to create at least one operator that can be used for mapping the non-Hamming distance space to a Hamming distance space. The program also causes the client device to create a set of masks and a set of lockers based on using the at least one operator and a computational reusable fuzzy extractor, wherein at least one of: a secret or a cryptographic key is encrypted in at least one of the set of lockers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIG. 10 is a table showing hyper-parameters for face and voice biometrics according to various examples of the present disclosure.

FIG. 11 is a table showing results of face/voice verification networks for optimized and best Euclidean distance thresholds according to various examples of the present disclosure.

FIG. 12 is a table showing results for different datasets according to various examples of the present disclosure.

FIG. 13 is a table showing results of how various parameters change across different lengths of Locality-Sensitive Hashes (LSH) according to various examples of the present disclosure.

FIG. 14 is a table showing results of how various parameters change across different probability ratios for masking unreliable bits at LSH of 256 bits according to various examples of the present disclosure.

FIG. 15 is a table showing results of how various parameters change across different number of facial samples per subject at LSH of 256 bits according to various examples of the present disclosure FIG. 16 is a table showing results of how number of subsampled bits affects degrees of freedom according to various examples of the present disclosure.

FIG. 17 is a table showing results of how various parameters change across Hamming Distance (HD) thresholds between 0 and 12 bits according to various examples of the present disclosure.

FIG. 18 is a table showing results of various trials according to various examples of the present disclosure.

DETAILED DESCRIPTION

Figure 1:
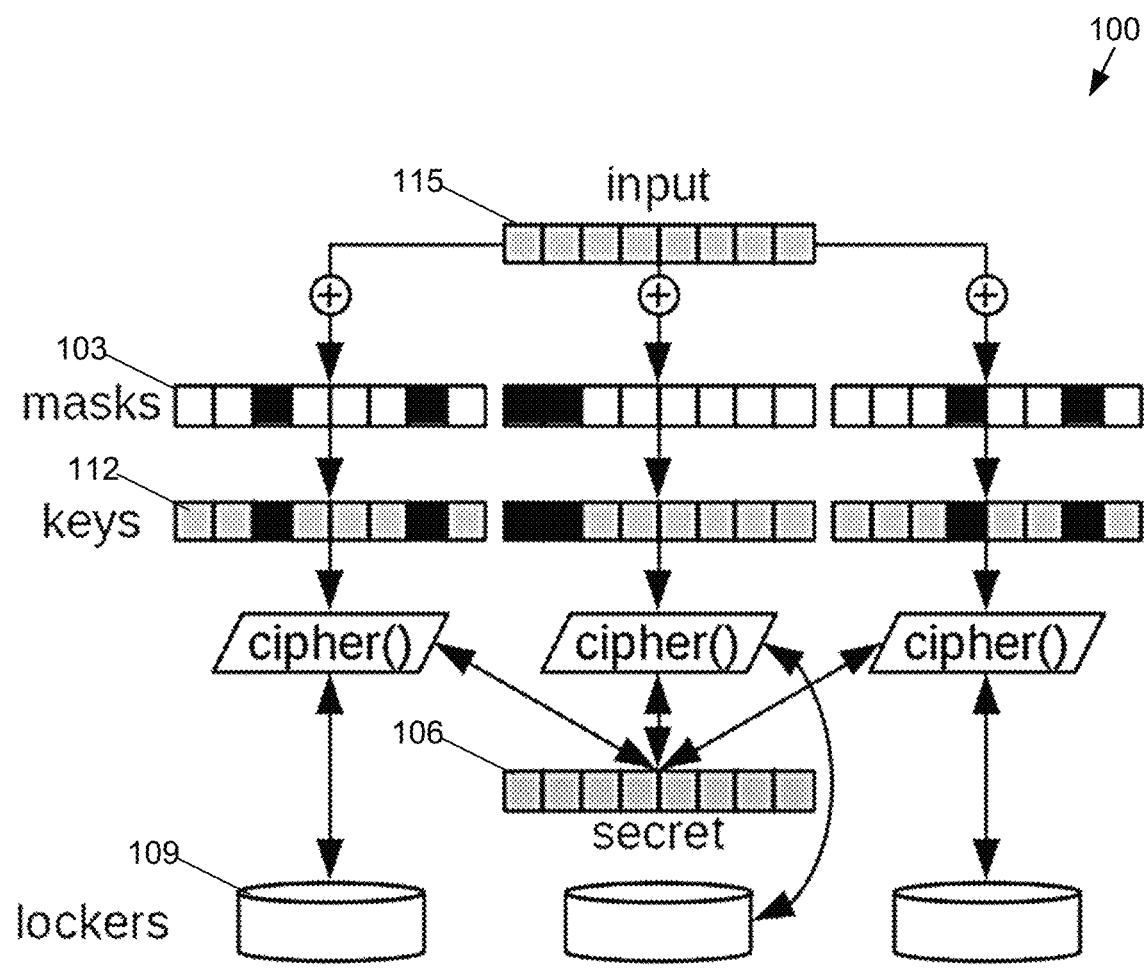
FIG. 1 is an example of a reusable fuzzy extractor according to various examples of the present disclosure.

Authentication with biometrics is gaining popularity, in part because biometric features are difficult to lose and easy to measure thanks to the widespread adoption of smartphones. This brings challenges, such as the need for preventing replay and protecting user privacy against the server, forcing current solutions to keep the enrolled model on the user's device, not the server. This can bind such authentication to a specific device, resulting in two serious drawbacks. The first is that a user has to carry his enrolled device. The second drawback is that recovery, such as when the device is lost or needs to be replaced, is often by non-biometric means such as what the user knows (e.g., password). These drawbacks can be eliminated if biometric data can be stored on and used by a server in a privacy-preserving manner. Biometrics are already used to unlock iPhones and make payments. Biometrics are hard to lose or forget and easy to measure with high fidelity due to the widespread adoption of sensor-rich smartphones. These two properties allow for recovery from zero: recovering one's identity without needing to have or remember anything.

Examples of this disclosure provide systems and methods for biometric authentication that can bridge fuzzy extractors with deep learning and achieve the goals of preserving privacy and providing recoverability from zero. While some examples of this disclosure discuss face-based authentication, the present disclosure can also be used with voice-based authentication, a combination of the two, or potentially other biometric features of a user associated with a client device.

The present systems and methods disclose privacy-preserving biometric authentication systems and methods. These systems and methods bridge fuzzy extractors, which are highly efficient in restricted metric spaces such as Hamming, with deep learning that is accurate but reliant on non-Hamming distance spaces like Euclidean and cosine. One key technical contribution disclosed herein is a mapping between spaces allowing these subsystems to work together. The system can achieve 0.16% false rejection rate and 0.00% false acceptance rate with fixed hyper-parameters on a cleaned subset extracted from a large YouTube Faces (YTF) dataset.

Unfortunately, biometric-based authentication struggles with two challenges: Privacy and Theft. Biometrics raise privacy concerns, especially when used remotely. Most existing technologies require the server to handle unencrypted biometric data. Applying homomorphic encryption (with the user storing decryption keys) could resolve this (modulo efficiency concerns). However, it is desirable for the user to be keyless, as discussed above. Regarding theft, biometrics cannot be replaced. Once stolen, an adversary can impersonate the victim forever. The most popular biometrics (face and voice) can also be easy to steal. Part of the problem is the lack of encoding for intent. For example, some payment card processors check for smiling or blinking. People smile and blink all the time! They do it unconsciously and without the intent of making a purchase.

Current solutions handle authentication by using biometrics locally to unlock keys that attest identity. Keeping the enrolled model local means it can be non-transferable. While this addresses theft, it limits authentication to a device, unlike passwords that allow login from anywhere. It also makes recovery difficult and as a result users still need a backup form of authentication. If systems cannot efficiently preserve the recovery from zero property, biometrics will tend to require fallbacks and passwords will remain prevalent.

The present disclosure includes a biometric authentication system that addresses privacy and theft without sacrificing recovery. Specifically, this system can 1) respect privacy by not storing unencrypted data on remote servers, 2) resist theft by using dynamic challenges while 3) enabling recovery with biometrics, even when a device is lost or stolen.

At the high level, it is possible to combine deep learning techniques, locality-sensitive hashing (LSH) and computational reusable fuzzy extractor (FE). It is a substantial technical challenge to combine these very disjoint techniques to achieve a high-performing, low-error system; in experiments, the system observes (false rejection rate (FRR), false acceptance rate (FAR)) of (0.16%, 0%) on a clean subset of YouTube Face (YTF) benchmark dataset.

The Fuzzy Extractor (FE) as described by R. Canetti, B. Fuller, O. Paneth, L. Reyzin, and A. Smith, in "Reusable fuzzy extractors for low-entropy distributions," In Annual International Conference on the Theory and Applications of Cryptographic Techniques, pages 117-146. Springer, 2016 ("R. Canetti et al."), is a key privacy tool that can be employed. Their construction is quite simple: hash multiple random subsets $w_{I_j}$ of the biometric reading w. The hope is that a "close" (to w) biometric sample w' is likely to have at least one random subset equal to that of w. Assuming this, systems can simply encrypt a strong key r by appropriately hashing it with a nonce and $w_{I_j}$ (in the Random Oracle (RO) model). The number of such hashes (called digital lockers) constitutes a tradeoff between security/privacy and usability properties of the scheme. R. Canetti et al. prove the reusability property of the biometric in the computational setting. Reusability means that repeated enrollments do not reduce the security/privacy of the biometric. The intuition is that in each new enrollment, new random subsets will be used. Crucially, RO application hides all information (against polytime attacker) about the encrypted value, except, of course, for the ability to check for equality, which corresponds to a brute-forcing step. Because of this, under the widely-accepted RO assumption, storing a number of lockers is equivalent to storing a single one, and in fact there is no effective loss of entropy due to locker use. Here systems can make the assumption that the entropy of the original biometric is not very high, and in particular, is lower than the bit length of the FE mask (which can be 64 bits in some implementations). Further, systems can assume that the entropy of the biometric is "spread out" across the string given as input to FE, and hence FE masking does not "mask out" the entropy.

Entropy of the biometric. This is indeed a simple and elegant scheme, which doesn't follow the more traditional information-theoretic approach, such as the elliptic-curve cryptography (ECC)-based FE constructions. The latter line of work usually approaches entropy analysis by determining entropy loss of the original biometric due to the release of helper data. Such approaches implicitly rely on the entropy analysis of the original biometric. In the computational entropy approach, which systems can take, the entropy/security analysis is often done by gathering statistics on the success rate (FRR/FAR) of the entire scheme. It is stressed that an observed FAR=0% without changing any parameters on over 31 billion random brute force attempts through 2 million impostor identities gives strong privacy assurance.

To show the scheme's value, an end-to-end prototype has been built. On a constrained subset of YTF, the system achieves empirical error rates (FRR, FAR) of (0.16%, 0%) with a theoretical chance of impersonation with random face of 1 in 17 million. The present system then consider face combined with voice and find slightly higher false rejection, but also a significantly lower impersonation chance of 1 in 8.6 billion.

The present system propose a privacy-preserving biometric authentication approach leveraging deep learning, LSH and FE and apply it to facial recognition. One key insight is how to map spaces natural to recognition (e.g. Euclidean and cosine) to Hamming distance, which is more natural for cryptography. The disclosed systems and methods can use dynamic challenges and mobile phones to allow for recovery from zero. Several experiments to demonstrate accuracy and security have been conducted. Minute false rejection rate of 0.16% on a clean subset of a public dataset and zero impersonations from 2 million synthetic identities have been observed.

Reference is made throughout to the work by J. Bonneau, C. Herley, P. C. Van Oorschot, and F. Stajano, "The quest to replace passwords: A framework for comparative evaluation of web authentication schemes," In Security and Privacy (SP), 2012 IEEE Symposium on, pages 553-567. IEEE, 2012 ("Bonneau et al."), which offers a systematic and complete set of criteria to compare authentication systems in terms of usability, deployability and security.

Over the years, many alternatives to password have been proposed. These schemes are examined in-depth by Bonneau et al. Relevant to the present work are: i) OpenID, which is considered among the best in usability and deployment, but weak in security due to its reuse of the same password across services and ii) biometrics, which suffer in usability and security due to low accuracy and requires major deployment to deploy in place of existing password systems.

The present systems and methods are compliant with the OpenID authentication service, so that they can achieve similar usability and deployability. Also, the present systems and methods overcome the usability and security issues of biometrics by achieving added privacy and high accuracy through deep pattern recognition. The present systems and methods can use sensors already available in mobile devices. Finally, since OpenID is supported by enterprises like FIDO and Google, it is believed that the need for server modifications is no longer an unsurmountable problem, as more and more organizations are adopting the OpenID standard (or other single-sign-on standards).

One related work is deep learning for recognition. Deep learning techniques have been shown to outperform human accuracy and are now the de-facto method of facial recognition and verification. Examples include methods described by F. Schroff, D. Kalenichenko, and J. Philbin, "Facenet: A unified embedding for face recognition and clustering," In Proceedings of the IEEE conference on computer vision and pattern recognition, pages 815-823, 2015 ("FaceNet"), and methods described by Y. Taigman, M. Yang, M. Ranzato, and L. Wolf, "Closing the gap to human-level performance in face verification," In Proceedings of the IEEE conference on computer vision and pattern recognition, pages 1701-1708, 2014 ("DeepFace"), yielding 99.63% and 97.35% accuracy respectively on verification of the LFW dataset from G. B. Huang, M. Ramesh, T. Berg, and E. Learned-Miller, "Labeled faces in the wild: A database for studying face recognition in unconstrained environments," Technical report, Technical Report 07-49, University of Massachusetts, Amherst, 2007 (LFW dataset). Generally speaking, most deep learning facial recognition and verification systems are structured as a two-step process. The first step turns the input facial image into a one-dimensional vector called an embedding. The second step either feeds the embeddings into a Support Vector Machine (SVM) for recognition or compares the distance between embeddings for verification. Models have been trained to express Euclidean distance, cosine similarity or L1 distance.

Deep learning can also be used for voice. For instance, the method described by C. Li, X. Ma, B. Jiang, X. Li, X. Zhang, X. Liu, Y. Cao, A. Kannan, and Z. Zhu, "Deep speaker: an end-to-end neural speaker embedding system. arXiv preprint arXiv:1705.02304, 2017 ("DeepSpeaker"), achieves 95% accuracy on the text-independent speaker verification task for very large datasets in English and Mandarin. Similarly to FaceNet, it turns inputs into embeddings based on cosine similarity and then a threshold is used to distinguish different agents.

Other related works involve privacy-preserving biometric matching. The fuzzy Extractor (FE) line of work is a formal cryptographic approach to biometric authentication. The main idea of FE is to employ error correction schemes to recover an enrollment-established secret from non-sensitive helper data using biometric sample obtained at authentication time. Informally, an $(m, 1, t, \epsilon)$-fuzzy extractor scheme is a pair of algorithms (Gen,Rep) ("generate" and "reproduce"). Gen, on input $w \in M$ from the input metric space with entropy m outputs an extracted string $R \in \{0,1\}^\ell$ and a helper string $P \in \{0, 1\}^*$. The FE correctness property ensures reconstruction of R from close biometric: if $dist(w; w') \leq t$ and $(R; P) \leftarrow Gen(w)$, then $Rep(w', P) = R$. Finally, the crucial privacy property guarantees that the string R is close (expressed in terms of $\epsilon$) to uniform, even if the helper data P is known. By the nature of the fuzzy extractor, the helper data P contains some information about the original biometric, which reduces the available entropy. Entropy loss of $(m, 1, t, \epsilon)$-fuzzy extractor is $m-\ell$. The present work uses computational fuzzy extractor where, in particular, the entropy treatment is quite different.

Variants and applications of FE: fuzzy encryption, etc. Basic FE has numerous applications and variants. It is convenient to view it as a "converter" of fuzzy (e.g., unreliably resampled) key material into arbitrary key material, including randomness, secret keys, public keys, etc. Therefore fuzzy symmetric and public-key encryption, fuzzy commitment, etc., can easily be created simply by encrypting the corresponding secret key with the extracted string R.

Examples herein disclose privacy-preserving biometric authentication system(s), method(s), and computer-readable medium(s) embodying programs. System(s) can include a client device and a computing device. Examples can include a client device with a processor and an application that can be executed by the processor. The client device can initiate generation of an enrollment embedding comprising a biometric data embedding in a non-Hamming distance space (e.g., Euclidean distance, cosine similarity, or L1 distance), and process the enrollment embedding to create at least one operator that can be used for mapping the non-Hamming distance space to a Hamming distance. The client device can create a set of masks and a set of lockers by using the at least one operator and a computational reusable fuzzy extractor. A secret can be encrypted in at least one of the set of lockers. The client device can send metadata to a computing device over a network, where the metadata is generated by the computational reusable fuzzy extractor. The metadata can include the set of lockers, the set of masks, and a personal reliable bit map. In some examples, the operator is the personal reliable bit map or a reliable locality-sensitive hash (LSH).

The client device can also generate and send a unique ID to the computing device. The client device can generate a public key and a private key and send the public key to the computing device. In some examples, the private key is the secret that is encrypted in the at least one of the set of lockers. The private key can also be encrypted in each one of the set of lockers.

The client device can initiate generation of an authentication embedding with an input data embedding in a Euclidean space, and determine whether applying the set of masks to the authentication embedding recovers the secret. The client device can also obtain a message sent by the computing device, where at least a portion of the message includes a response encrypted using the public key. In response to determining that applying the set of masks to the authentication embedding recovers the secret, the client device can decrypt the at least the portion of the message using the secret and send the response to the computing device.

In some examples, the client device can receive a request to perform a liveness challenge. In response to receiving a request to perform a liveness challenge, the client device can capture a video, an image, or a voice. The enrollment embedding can be based on the video, the image, or the voice. The client device can also perform a text extraction (e.g., apply a speech-to-text process, use a library, API, or service for speech recognition) on the video or the voice. In some examples, the client device can, in response to receiving metadata sent by the computing device, send a second set of lockers, a second set of masks, and a second personal reliable bit map to the computing device.

Turning to the drawings, FIG. 1 illustrates an example of a reusable fuzzy extractor (FE) 100. A privacy-preserving biometric authentication can be based on the fuzzy extractor with digital lockers of R. Canetti et al. Recall, FE can work by creating a set of k random masks 103 and encrypting the secret 106 k times to create k lockers 109. (A locker is simply a keyed nonce-based encryption under RO). The key 112 to each locker 109 is the corresponding mask 103 applied to the enrollment input 115. When a biometric sample or authentication input 115 is used to attempt decryption, each mask 103 is applied and the result is tested against the corresponding locker 109. If any locker 109 successfully decrypts, the secret 106 is recovered (cf. FIG. 1). By adjusting the number of masks 103 and how many bits each mask 103 filters, the system can control how close the sample has to be to the enrolled biometric to recover the secret 106. This is calculated as a probability for a chosen threshold and input length.

This algorithm has several important properties. First, lockers 109 disclosure does not reduce the computational entropy of the biometric, but does allow to perform the brute-force search. Second, this algorithm is "reusable" and can be securely used multiple times for the same enrollment input 115. This does not mean that a cracked biometric can be recovered by re-enrolling. Since the locker-stored secret 106 can be any data, the system can lock up an asymmetric key pair that the client device uses for cryptographic processing that can enable the client device to prove its identity to the computing device. FIG. 1 depicts an overall reusable fuzzy extractor algorithm 100 where encryption and decryption are shown. A computing device can store the masks and lockers, thereby enhancing privacy, as described in further detail with regard to FIG. 2.

Figure 2:
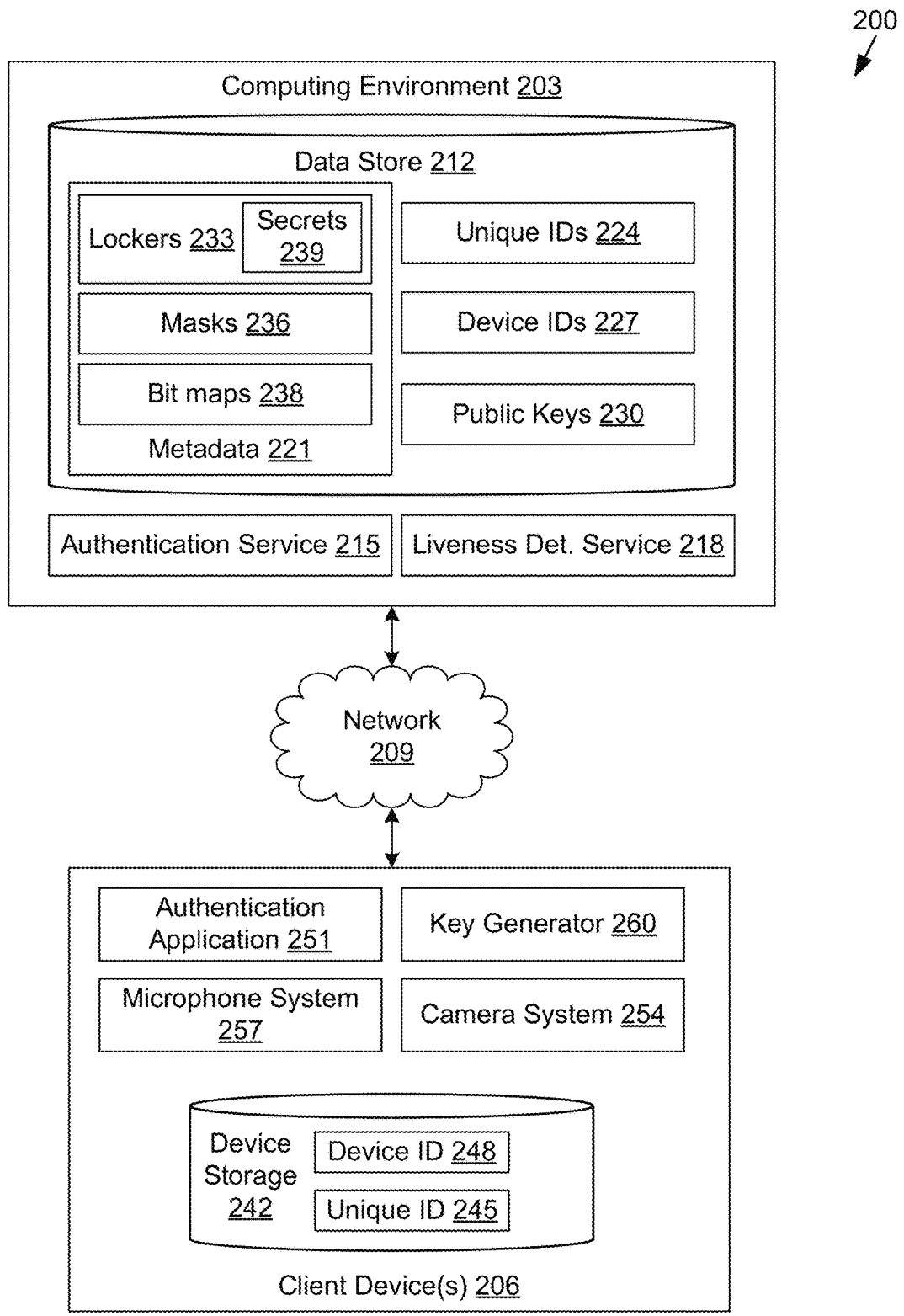
FIG. 2 is a drawing of a system according to various examples of the present disclosure.

With reference to FIG. 2, shown is a system 200 according to various examples. The privacy preserving biometric authentication in the system 200 can achieve 0.16% FRR and 0% FAR. The system 200 includes a computing environment 203 and one or more client devices 206 in communication by way of network 209. The network 209 can include, for example, wide area networks (WANs), local area networks (LANs), wired networks, wireless networks, other suitable networks, or any combination of two or more networks. For example, the network 209 can include satellite networks, cable networks, Ethernet networks, and other types of networks.

The computing environment 203 can be a computing environment that is operated by an enterprise, such as a business or other organization. The computing environment 203 can include, for example, a server computer, a network device, or any other system providing computing capabilities. Alternatively, the computing environment 203 can employ multiple computing devices that can be arranged, for example, in one or more server banks, computer banks, or other arrangements. The computing devices can be located in a single installation or can be distributed among many different geographical locations. For example, the computing environment 203 can include multiple computing devices that together form a hosted computing resource, a grid computing resource, or any other distributed computing arrangement. In some cases, the computing environment 203 can operate as at least a portion of an elastic computing resource where the allotted capacity of processing, network, storage, or other computing-related resources can vary over time. The computing environment 203 can be located remotely with respect to the client device 206.

Various applications and/or other functionality can be executed in the computing environment 203. The data store 212 can be representative of a plurality of data stores 212 as can be appreciated. The data stored in the data store 212, for example, is associated with the operation of the various applications and/or functional entities described below.

The components executed on the computing environment 203 can include an authentication service 215, and other applications, services, processes, systems, engines, or functionality not discussed in detail herein. The authentication service 215 can bridge fuzzy extractors with deep learning and enroll a user in an authentication system, authenticate the user, and recover a secret that allows the user to reenroll in the authentication system.

The authentication service 215 can receive a request to start an enrollment session sent by a client device 206. An enrollment session can include for example various processes related to liveness detection, distance space mapping, and preserving privacy, as will be discussed with regards to the system 200. The authentication service 215 can enroll a user associated with the client device 206 based upon factors such as his or her face or voice, or other biometric features of the user. Additionally, the authentication service 215 can maintain an archive or database in the data store 212 of metadata, identifiers, or keys (or other cryptography information) related to the users of the client devices 206. The authentication service 215 can also perform authentication and recovery processes related to the privacy preserving face-based authentication disclosed herein.

In some examples, the computing environment 203 can execute a liveness detection service 218 that can detect a liveness of a user associated with the client device 206 and prevent large scale attacks (e.g., large scale replay of stored biometric data intended to circumvent biometric authentication). The liveness detection service 218 can use a modified version of a system disclosed by E. Uzun, S. P. H. Chung, I. Essa, and W. Lee, "rtcaptcha: A real-time captcha based liveness detection system," In NDSS, 2018 ("rtCaptcha") for liveness detection. Since the original rtCaptcha design has the server verifying videos of challenge responses, it does not preserve privacy. The system can incorporate a modified rtCaptcha into privacy-preserving processes so that liveness detection service 218 sends a CAPTCHA to the client device 206, and the client device 206 uses speech-to-text to extract the solution in plaintext for the liveness detection service 218 to verify. This can be done in parallel with the data extraction for the privacy preserving authentication using the same video. In this way, the liveness detection service 218 can determine that the user has answered the CAPTCHA correctly, and the authentication service 215 can determine the user in the video is the enrolled user.

In operation, the liveness detection service 218 can generate one or more random phrases and convert the random phrases to a CAPTCHA. The liveness detection service 218 can send the CAPTCHA to the client device 206 and start a timer. The liveness detection service 218 can receive from the client device 206 one or more text values and a unique ID 224, and stop the timer. The difference between the start of the timer and stop of the timer is t. The liveness detection service 218 can determining whether t is less than a threshold ($T_{thr}$) If t is less than the threshold the liveness detection service 218 can also compare the unique ID sent by the client device 206 with a corresponding unique ID stored in unique IDs 224. The liveness detection service 218 can also determine that the one or more text values and the random phrases are equal.

The authentication service 215 can leverage the client device 206 (e.g., a user's mobile phone) as a second factor so live biometrics are only needed to bind the client device 206 with the user. Once the client device 206 is associated, the authentication service 215 can determine that the client device 206 is enrolled and associated with a user, and store a device ID 227 that uniquely identifies the client device 206 and indicates to the authentication service 215 that the authentication service 215 does not need to execute the liveness detection service 218 for the user. In this way, the authentication service 215 can refrain from sending CAPTCHAs for the user to solve during authentication. The user can solve CAPTCHAs during enrollment and recovery. Of course, the authentication service 215 supports requiring the user to solve a CAPTCHA during authentication regardless of an association of the client device 206.

The data stored in the data store 212 can include metadata 221, unique IDs 224, device IDs 227, public keys 230, and potentially other data. The metadata 221 can include masks 236 and lockers 233 created, at least in part, by a computational reusable fuzzy extractor. The metadata 221 can also include a reliable bit map 238 (also known as personal mask, personal bit map, or personal reliable bit map) that is created based at least on processing a biometric data embedding (for example, in a Euclidean space). Processing the biometric data can include creating the reliable bit map 238 based on one or more Locality Sensitive Hash(es) (LSH). The reliable bit map 238 is used, for example, to eliminate inconsistent LSH bits through multiple scans of a single person, as further discussed in a section below. Secrets 239 are locked inside many lockers 233 such that the key to unlock each locker 233 is a hash of a user's face filtered with a random mask (which can be one of the masks stored in masks 236). Unique IDs 224 can store a unique identifier that corresponds with a user of the client device 206. The unique IDs 224 can be generated by the computing environment 203 or the client device 206, and can be based on device identifiers, user identifiers, personally-identifiable information, or other information.

Device IDs 227 can include device records corresponding to client devices 206 for which a secret 239 is stored in the data store 212. Each one of the device IDs 227 can uniquely identify a client device 206 that is enrolled in the privacy-preserving biometric authentication system 200. The device IDs 227 can represent an identifier the system 200 can use as a second factor, or an identifier that the system 200 can use to forego liveness detection. Public keys 230 can store public keys that the system 200 can use for cryptographic processes.

To briefly summarize the operations of the system 200, the system 200 can include an enrollment process. To enroll a new user, the authentication application 251 can prompt the user to enter his/her unique ID 245 (X). After the unique ID 245 has been confirmed to be unique, the authentication application 251 will capture biometric data of the user (e.g. face, voice etc.). Facial features (or embeddings) are extracted by using state-of-the-art deep learning-based algorithms (e.g., FaceNet, DeepFace) which can be from multiple facial scans of the user. Then, Locality Sensitive Hashes ($X_{lsh}$) are generated for each of the embeddings. Bit arrays in $X_{lsh}$ represent facial scans at this point and could be in different lengths (e.g., 64 bits). If the hashes in $X_{lsh}$ has too much entropy, which could result in false rejection, the authentication application 251 can repeat the process beginning with face scanning. After getting reliable hashes (also called "Secure Hashes"), authentication application 251 can generate a personal bit map $X_{rbmap}$ that can eliminate unreliable bits in $X_{lsh}$. This process decreases the distance between hashes of same person, which increases the true positive rates without increasing false positive rates. Then, the authentication application 251 can mask the $X_{lsh}$ by using $X_{masks}$ and generate $X_{lshm}$. The fuzzy extractor gets the $X_{lshm}$ and generates data to be stored as metadata 221 ($X_{meta}$). The metadata 221 can include the masks 236 ($X_{masks}$), the lockers 233 ($X_{lockers}$), and the personal reliable bit map 238 ($X_{rbmap}$). The authentication application 251 can send the data to the authentication service 215 to be stored as the metadata 221 ($X_{meta}$). In some examples, the authentication application 251 can generate bit maps 238 without using the fuzzy extractor.

The system 200 can also cause the authentication application 251 to generate one or more embeddings (e.g., using FaceNet). FaceNet is a deep learning-based face recognition/verification system. Its accuracy is not only state-of-the-art but beat human level performance for the task of face recognition/verification. In FaceNet, deep learning is used to train a deep convolution network to turn an input image that contains a face into an embedding, which is a 128-byte, 128-dimension vector, and this neural network needs only be trained on images from different persons once and can then be used to create embedding for any face not in the training set (e.g., it's not a per-person training). One important property of this embedding is that if the person/face in two images are the same, the Euclidean distance of the 128-dimension vector output by the neural network will be below certain threshold with high probability; otherwise, the distance between the two embedding will be above the threshold.

The system 200 can also cause the authentication application 251 to generate Locality Sensitive Hashes (LSH). LSHs are special families of hash function which take inputs for which some distance function d is defined. Stated explicitly, given an LSH h, a distance function d, and inputs x and y, h guarantees:

if $d(x,y) \leq \delta^c$ then $Pr[h(x)=h(y)] \geq p_1$ if $d(x,y) \geq \delta^f$ then $Pr[h(x)=h(y)] \leq p_2$     (1)

where $\delta^c$, $\delta^f$, p1, and p2 are tunable parameters. After converting embedding vectors, there is a bit array with a chosen size.

The system 200 can cause the authentication application 251 to check if the LSH are reliable. To avoid high false rejections, the system 200 can make a preliminary analysis on collected facial samples through their LSHs. If the average Hamming distances among LSHs of a person is above a certain threshold, it implies that face is not scanned properly (e.g., bad illumination, pose, occlusion etc.). In this case, the system 200 can start the process from face scanning and generate LSHs until getting reliable hashes.

The system 200 can cause the authentication application 251 to mask unreliable bits. The disclosed approach suppresses errors in LSHs is avoiding unreliable bits by masking them in both enrollment and authentication/recovery processes. To do this, the system 200 can check each bit among all LSH bit arrays. If the bit has a high entropy then the system 200 can disregard the bit (or not consider it) in Hamming distance measurement. The entropy could be set to any choice of probability (e.g., suppress a bit if it gets different values with 0.3 probability). The system 200 can apply a personal bit map ($X_{rbmap}$) and generate LSHs ($lsh_{rel}$).

The system 200, including the authentication application 251 and the authentication service 215, can use a fuzzy extractor (FE). Fuzzy Extractors are a cryptographic building block that allow for the same key, $X_{key}$, to be derivable from noisy readings of the same source; in this case, the hash derived from a picture of the user's face. Put plainly, two readings will yield the same key with high probability if the Hamming distance between those readings is within a configured threshold. This is done using a primitive known as a "digital locker". The digital locker simply "locks" (encrypts) some value with some key such that the value can only be "unlocked" (decrypted) with that same key. To implement the Fuzzy Extractor using lockers 233, the system 200 can randomly pick a $X_{priv}$, and lock it inside many lockers 233 as a secret 239 such that the key to unlock each locker 233 is a hash of the user's face filtered with a random mask. By adjusting the number of lockers 233, the system 200 can tune the threshold needed to recover $X_{priv}$. These lockers 233, along with their corresponding masks 236 become the metadata 221 $X_{meta}$ since the lockers 233 are ciphertext generated by encrypting a secret 239 with bits extracted from the secret biometric data, masks 236 essentially only allow one to reconstruct the keys to the lockers 233 if one has something similar to the original biometric data, the metadata 221 $X_{meta}$ is not a cryptographic secret (e.g., $X_{meta}$ does not leak $X_{key}$). This means the system 200 can disclose $X_{meta}$ to the computing environment 203 and later request it for recovery. Since $X_{meta}$ is not a secret, even if an adversary requests $X_{meta}$, they will not be able to efficiently derive $X_{priv}$ from it. An advantage of the present disclosure is that the computing environment 203 does not need to store or handle unencrypted biometric data. Metadata can be generated by the authentication service 251 and stored by the authentication service 215 as metadata 221. The authentication service 215 can also update or augment a previously stored metadata in the metadata 221 with lockers 223 ($X_{lockers}$), masks 236 ($X_{masks}$), and/or bit maps 238 ($X_{rbmap}$) generated by a client device 206 for which a previously generated secret 239 is stored in the lockers 233.

The client device 206 can represent multiple client devices 206 coupled to the network 209. The client device 206 includes, for example, a processor-based computer system. According to various examples, a client device 206 can be in the form of a desktop computer, a laptop computer, a personal digital assistant, a mobile phone, a smartphone, or a tablet computer system.

The client device 206 can execute an operating system, such as WINDOWS, IOS, or ANDROID, and has a network interface in order to communicate with the network 209. The client device 206 has a device storage 242 with various data, including application data, operating system data, and other data. In the context of this disclosure, the device storage 242 can house a unique ID 245 that uniquely identifies a user associated with the client device 206. In some examples, the unique ID 245 can be one or more device IDs 248 which are identifiers that may be available from the client device 206. Device ID 248 can include a mobile phone number, MAC address of a wireless chipset, MEID, UDID, future device identifiers, and other device identifiers. In some examples, the client device 206 or the computing environment 205 can generate the unique ID 245.

The client device 206 can execute an authentication application 251 that can perform enrollment, authentication and recovery processes related to the privacy preserving face-based authentication disclosed herein. For example, the disclosure provides a way for the client device 206 to handle unencrypted biometric data, but the client device 206 does not need to store the unencrypted biometric data. The authentication application 251 can also communicate with the authentication service 215 for various purposes.

The authentication application 251 can collect live biometric data such as a face or a voice of a user associated with the client device 206. The authentication application 251 can leverage a camera system 254 or a microphone system 257 on the client device 206 to capture a face or a voice, respectively. In many cases, the camera system 254 can be used to record a video that captures a face and a voice. The use of face and voice also creates opportunities for simple, deployable liveness detection.

The system 200 can incorporate a modified rtCaptcha into the privacy-preserving processes. The authentication application 251 can receive a CAPTCHA sent by the liveness detection service 218 and use the camera system 254 to record a video of the response. The authentication application 251 can use speech-to-text to extract the solution in plaintext for the liveness detection service 218 to verify.

The client device 206 can also execute a key generator 260 to create a secret that the client device 206 uses for cryptographic processing that can enable the client device to prove its identity to the authentication service 215. The secret can be a private key of a key pair based on the Rivest-Shamir-Adleman (RSA) cryptosystem. The client device 206 can execute the key generator 260 to create a public key and a private key. Following the example of the FIG. 1, the authentication application 251 can encrypt the private key k times to create k lockers, and then send the k lockers to be stored in lockers 233 containing each of which contains the private key as one of the secrets 239. The client device 206 can also send the public key to be stored in public keys 230, store the public key in the device storage 242, send the public key to a key server, or provide another mechanism for the public key to be accessible to the system 200.

Figure 3:
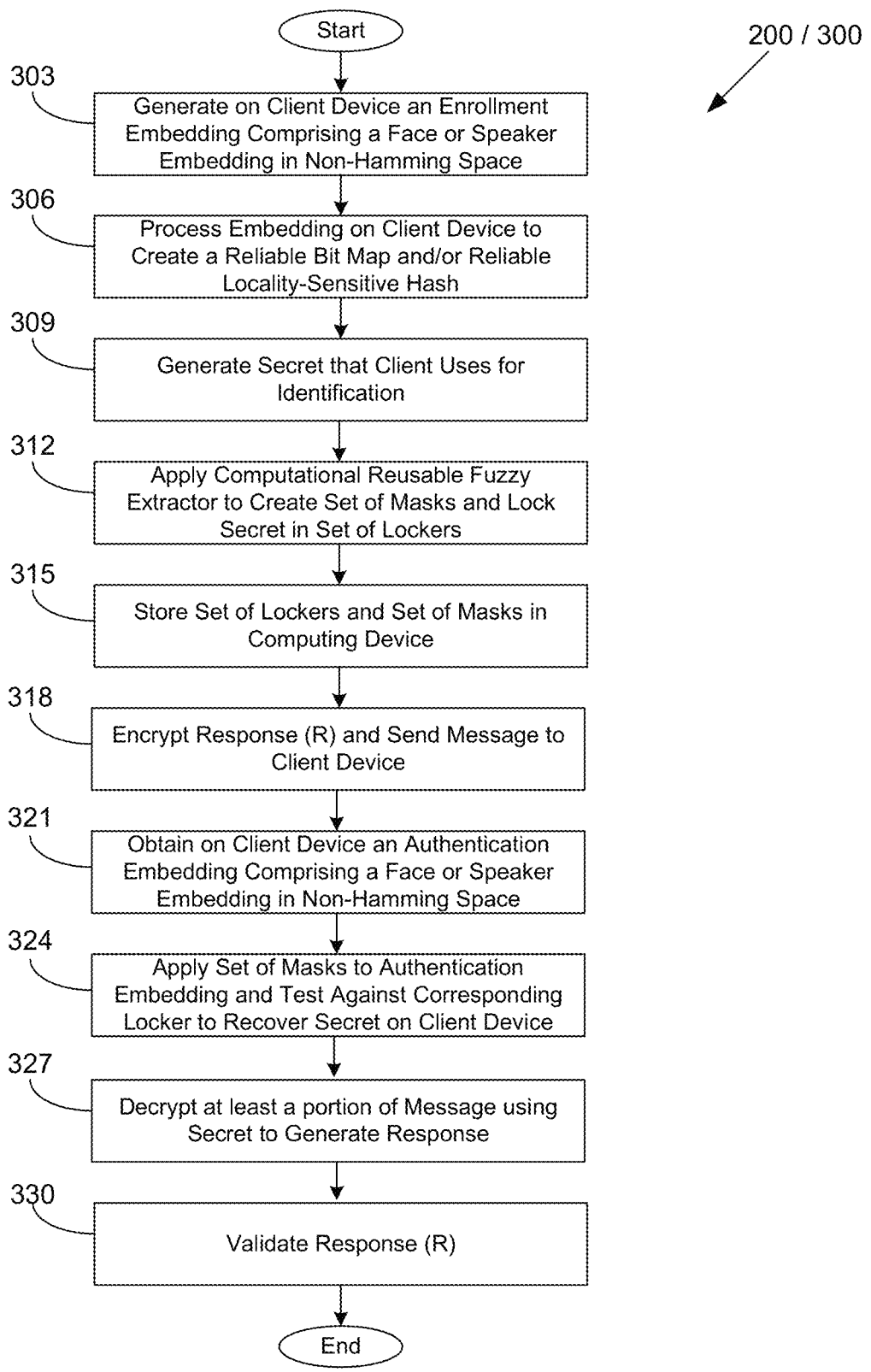
FIG. 3 is a drawing of a flowchart illustrating a method according to various examples of the present disclosure.

Referring next to FIG. 3, shown is a flowchart that provides one example of the operation of the system 200. Alternatively, the flowchart of FIG. 3 may be viewed as depicting steps of an example of a method 300 implemented to enroll and authenticate a client device 206 (FIG. 2). To make the biometric authentication system privacy preserving, the system 200 can present a way to determine whether two encrypted samples belong to the same person. Consider the case where the user presents a video as input to the authentication application 251 and the system 200 is tasked with authenticating the user based on their face and voice. Although the system 200 can focus on two particular biometric sources, the algorithm of the system 200 can generalize to others. Recall that three design goals are to 1) respect privacy by encrypting data available to the remote server, 2) resist theft using dynamic challenges while 3) enabling recovery solely with biometrics, even when a device is lost or stolen. Additionally, to facilitate frustration-free identity recovery, the system 200 can have the obvious requirement that its algorithm should yield low error rates.

The basic building blocks to this design are: i) state-of-the-art face and voice recognition that output embeddings in Euclidean and cosine spaces and ii) reusable fuzzy extractor (FE) with lockers 233. Any algorithm that generates "embeddings," such as those separated by a common distance metric, can be used. This design uses the generated embeddings as input to the FE to create lockers 233 containing an encrypted secret 239. The secret 239 can be any arbitrary data. The system 200 can create and store an asymmetric key pair, which the authentication application 251 can then use for authentication (e.g., via a key exchange) and/or account recovery (e.g., via decryption of user account information).

To facilitate privacy preservation, the computing environment 203 can store the lockers 233, the masks 236, and the bit map 238. The computing environment 203 can also store the user's public key (as one of the public keys 230) and store other account data. All data stored in data store 212 can be encrypted with strong encryption that can ultimately have same entropy as the original biometric.

As can be seen by the discussion below, the disclosed system 200 addresses several problems with existing systems. A FE can define the threshold in terms of Hamming distance whereas many advanced recognition systems output embeddings in Euclidean or cosine spaces. 2. The number of masks and lockers (k) needed for reliable authentication can grow quickly relative to the noisiness of the embeddings.

At box 303, the system 200 can obtain an enrollment embedding comprising a face or a speaker embedding in Euclidean space. The authentication application 251 can use the camera system 151 to obtain a video or an image that corresponds with a face of a user of the client device 106.

At box 306, the authentication application 251 can process an embedding on the client device 206 to create a reliable bit map 238 and/or reliable locality-sensitive hash (LSH). The authentication application 251 can use locality-sensitive hashing, which is a well-studied construct that takes input vectors and guarantees that for any two inputs, the resulting outputs will likely be the same if the distance between the inputs is within a set threshold. Stated explicitly, given an LSH h, a distance function d, and inputs x and y, h guarantees:

if $d(x,y) \leq \delta^c$ then $Pr[h(x)=h(y)] \geq p_1$ if $d(x,y) \geq \delta^f$ then $Pr[h(x)=h(y)] \leq p_2$ if $d(x,y) \geq \delta^f$ then $Pr[h(x)=h(y)] \leq p_2$ (1)

where $\delta^c$, $\delta^f$, p1, and p2 are tunable parameters.

LSH is available for many popular distance metrics, including those used by recognition systems (e.g. cosine distance, xi square distance. Furthermore, the system can apply multiple LSH hash functions from the same family to the input embeddings, by the nature of LSH, the system will obtain bit sequences that are close in Hamming distance if the inputs were close in the original space. In other words, the system can use LSH to convert the embeddings from their original spaces to Hamming space. The converted input can then be used with efficient FE.

At box 309, the authentication application 251 and/or the key generator 260 can generate a secret that client device 206 uses for cryptographic processing that can enable the client device 206 to prove its identity to the computing environment 203. At box 312, the authentication application 251 can apply a computational reusable fuzzy extractor to create a set of masks and a set of lockers, where the secret is encrypted in each one of the set of lockers. At box 315, the authentication service 215 can store the set of masks and the set of lockers as lockers 233 and masks 236 to enroll a user associated with the client device 206 in the privacy-preserving biometric authentication system 200.

At box 318, the authentication service 215 can encrypt a response (R) that can be decrypted using the secret. At box 321, the authentication application 251 can generate an authentication embedding comprising a face or speaker embedding in Euclidean space. At box 324, the authentication application 251 can apply the masks 236 to the authentication embedding and test against a corresponding locker of the lockers 233 to recover the secret 239. At box 327, the authentication application 251 can decrypt the response (R) using the secret 259. At box 330, the authentication service 215 can validate the response (R) to authenticate a client device 206. After completing box 330, the process proceeds to completion.

Figure 4:
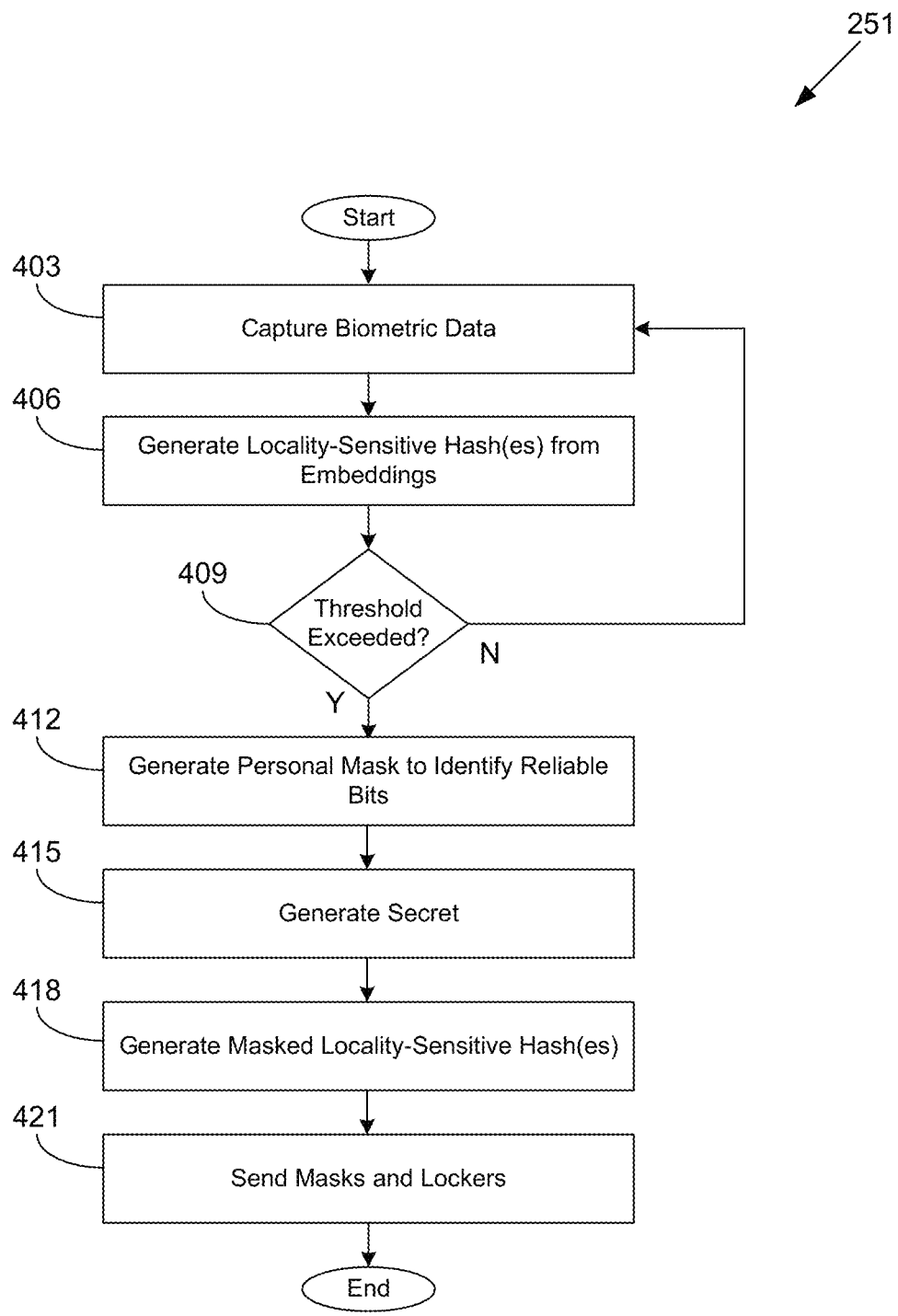
FIG. 4 is a drawing of a flowchart illustrating a method according to various examples of the present disclosure.

Referring now to FIG. 4, shown is a flowchart that provides one example of the operation of the authentication application 251 (FIG. 2). Alternatively, the flowchart of FIG. 3 may be viewed as depicting steps of an example of a method implemented to enroll a client device 206 (FIG. 2).

At box 403, the authentication application 251 can generate biometric data using the camera system 254 or the microphone system 257 of the client device 206. The camera system 254 can record a video (also known as user X's captured video or $X_{vid}$) that captures a face and a voice of a user associated with the client device 206. The video can be a response to a CAPTCHA sent by the liveness detection service 218. The microphone system 257 can record audio at the direction of the authentication application 251 that captures a voice of a speaker associated with the client device 206. The authentication application 251 can process the video or the audio using face and voice recognition to output embeddings in a non-Hamming distance space (e.g., Euclidean distance, cosine similarity, or L1 distance).

An example of face and voice recognition has been implemented. For faces, the system can use FaceNet to turn face images into 128 dimension, 128-byte vectors mapped in Euclidean space. The authentication application 251 can use the Python implementation of FaceNet with an Inception-Resnet-V1 architecture from C. Szegedy, S. Ioffe, V. Vanhoucke, and A. A. Alemi, "Inception-v4, inception-resnet and the impact of residual connections on learning," In AAAI, volume 4, page 12, 2017, and a pretrained model on the MSCeleb1M dataset of Y. Guo, L. Zhang, Y. Hu, X. He, and J. Gao, "Ms-celeb-1m: A dataset and benchmark for large-scale face recognition," In European Conference on Computer Vision, pages 87-102. Springer, 2016. The authentication application 251 can also use MTCNN from K. Zhang, Z. Zhang, Z. Li, and Y. Qiao, "Joint face detection and alignment using multitask cascaded convolutional networks," IEEE Signal Processing Letters, 23(10):1499-1503, 2016 to align faces in datasets.

For voice, authentication application 251 can use Deep-Speaker in a similar manner. One implementation of Deep-Speaker uses ResCNN (a ResNet style deep CNN) as the neural network architecture. The authentication application 251 can use softmax loss in the first 15 epochs for pre-training and triplet loss in the subsequent 10 epochs for the fine-tuning with the given hyper-parameters from the original DeepSpeaker work while building a voice authentication model. Finally, the system can modify the model to turn each input audio into 128 dimension, 128-byte vectors such that embeddings from the same person will be close in cosine similarity.

At box 406, the authentication application 251 can generate one or more locality sensitive hash(es) (LSH) from the embeddings generated at box 403. The authentication application 251 can use the LSH from J. Ji, J. Li, S. Yan, B. Zhang, and Q. Tian, "Super-bit locality-sensitive hashing," In Advances in Neural Information Processing Systems, pages 108-116, 2012, which uses cosine similarity, to turn these vectors into bit sequences. Evaluation shows how length affects accuracy and the number of masks. The authentication application 251 can also perform error correction during the conversion process. To further reduce noise, the authentication application 251 can take multiple measurements to improve the input quality. This comes at no cost to the user, since the system can use a short video as the raw input. Specifically, the authentication application 251 can take multiple readings of the user and compare their Hamming distances.

At box 409, the authentication application 251 can determine whether the readings exceed a set threshold. For example if the readings are too noisy, they will exceed a max distance threshold, signaling the authentication application 251 to present the user with feedback and try again. Additionally, the authentication application 251 eliminate noisy LSH bits that show significant variation across different readings from the same user. If the readings exceed the threshold, the authentication application 251 can return to box 403. Otherwise, the authentication application 251 proceeds to box 412.

At box 412, the authentication application 251 can generate a reliable bit map 238 ($X_{rbmap}$) to identify reliable bits ($lsh_{rel}$). At box 415, the authentication application 251 can use the key generator 260 to create a secret, which can include a cryptographic key (or key pair such as a public key and private key) that the client device 206 uses for cryptographic processing that can enable the client device 206 to prove its identity to the authentication service 215.

At box 418, the authentication application 251 can generate masked locality sensitive hash(es) (see, e.g., keys 112 in FIG. 1). The authentication application 251 can apply a computational reusable fuzzy extractor to create a set of masks 236 and a set of lockers 233, where the secret (or cryptographic key, or key pair) is encrypted in each one of the set of lockers as a secret 239. Recall from the example of FIG. 1, FE can work by creating a set of k random masks 103 and encrypting the secret 106 k times to create k lockers 109. The key to each locker is the corresponding mask applied to the enrollment input, which can be the output embedding (or enrollment embedding) discussed in box 403.

At box 421, the authentication application 251 can send metadata (also known as $X_{meta}$) to the authentication service 215 to be stored as metadata 221. The metadata 221 can include the masks 236 ($X_{masks}$), the lockers 233 ($X_{lockers}$), and the bit maps 238 ($X_{rbmap}$) generated by the authentication application 251 at box 418. The authentication application 251 can also send the public key generated at box 418 to be stored as one of a plurality of public keys 230. After completing box 421, the process proceeds to completion.

Figure 5:
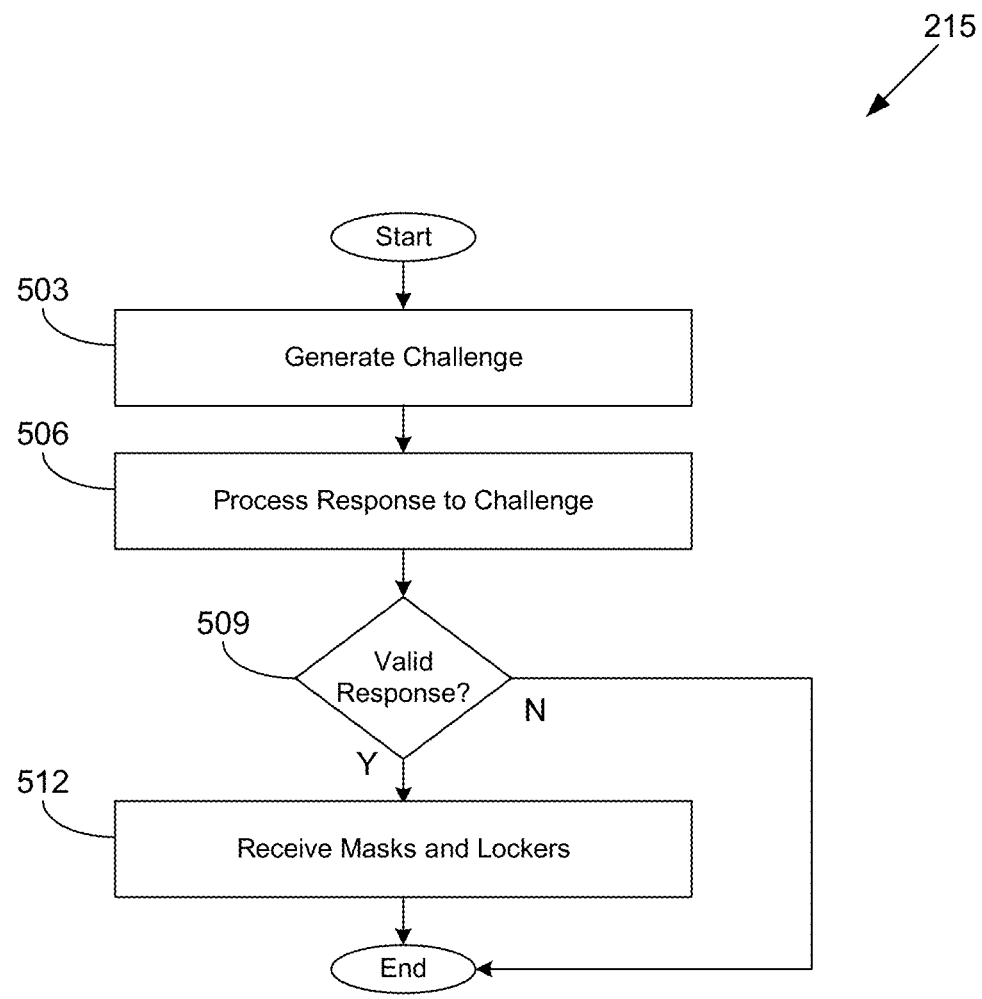
FIG. 5 is a drawing of a flowchart illustrating a method according to various examples of the present disclosure.

Next, FIG. 5 shows a flowchart that provides one example of the operation of the authentication service 215 (FIG. 2). Alternatively, the flowchart of FIG. 5 may be viewed as depicting steps of an example of a method implemented to enroll a client device 206 (FIG. 2).

At box 503, the authentication service 215 can generate a challenge, which can include causing the liveness detection service 218 to perform liveness detection. The authentication service 215 and/or the liveness detection service 218 can generate a challenge (comprising one or more random phrases) responsive to receiving a request, sent by the client device 206, to start an enrollment session. The authentication service 215 can also validate a unique ID sent by the client device 206, for example by comparing a corresponding unique ID stored in unique IDs 224. At box 506, the authentication service 215 can process the response to the challenge. For example, the authentication service 215 and/or the liveness detection service 218 can receive from the client device 206 one or more text values in a response.

At box 509, the authentication service 215 and/or the liveness detection service 218 can determine whether the one or more text values are equal to the random phrases (or determine that a response from the client device 206 is valid in some other way). If the response is valid, the authentication service 215 proceeds to box 512. Otherwise, the authentication service 215 can proceed to completion (e.g., terminate with an enrollment fail status).

At box 512, the authentication service 215 can receive metadata 221 sent by the client device 206. The authentication service 215 can store in the data store 212 lockers, masks, and a personal bit map sent by the client device 206 as lockers 223, masks 236, and bit maps 238 respectively. The authentication service 215 can also store one or more keys, such as a public key created by the key generator 260, as public keys 230. After completing box 512, the process proceeds to completion.

Figure 6:
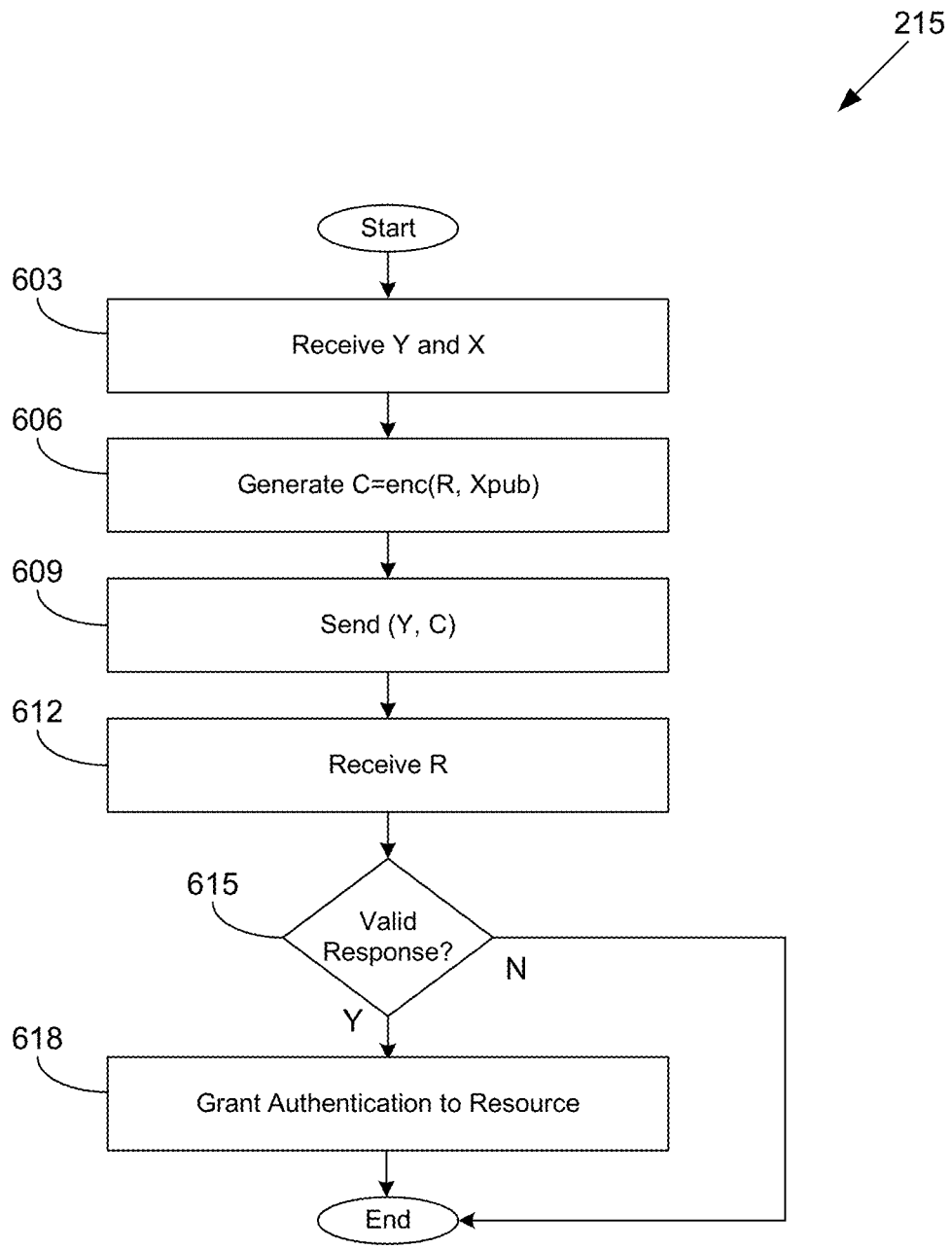
FIG. 6 is a drawing of a flowchart illustrating a method according to various examples of the present disclosure.

FIG. 6 shows a flowchart that provides one example of the operation of the authentication service 215 (FIG. 2). Alternatively, the flowchart of FIG. 5 may be viewed as depicting steps of an example of a method implemented to authenticate a client device 206 (FIG. 2).

At box 603, the authentication service 215 can receive (or get) (Y, X) sent by a network site conforming to the OpenID protocol. OpenID is an open standard and decentralized authentication protocol. At box 606, the authentication service 215 can generate C by encrypting a response (R) using a key ($X_{pub}$) stored for example as one of the public keys 230.

At box 609, the authentication service 215 can send a message to the authentication application 251. The message can include C and another value (Y). At box 612, the authentication service 215 can receive R sent by the authentication application 251.

At box 615, the authentication service 215 can determine whether R is valid. If R is valid (e.g., it is the same R encrypted in box 606), the authentication service 215 can proceed to box 618. Otherwise, the authentication service 215 can proceed to completion (e.g., terminate with an authentication fail status, send a negative result to network site conforming to the OpenID protocol, or refrain from sending a result to the network site).

At box 618, the authentication service 215 can grant authentication to a resource. For example, the authentication service 215 can send a positive result to the network site and thereby cause access to the resource to be granted. After completing box 618, the process proceeds to completion.

Figure 7:
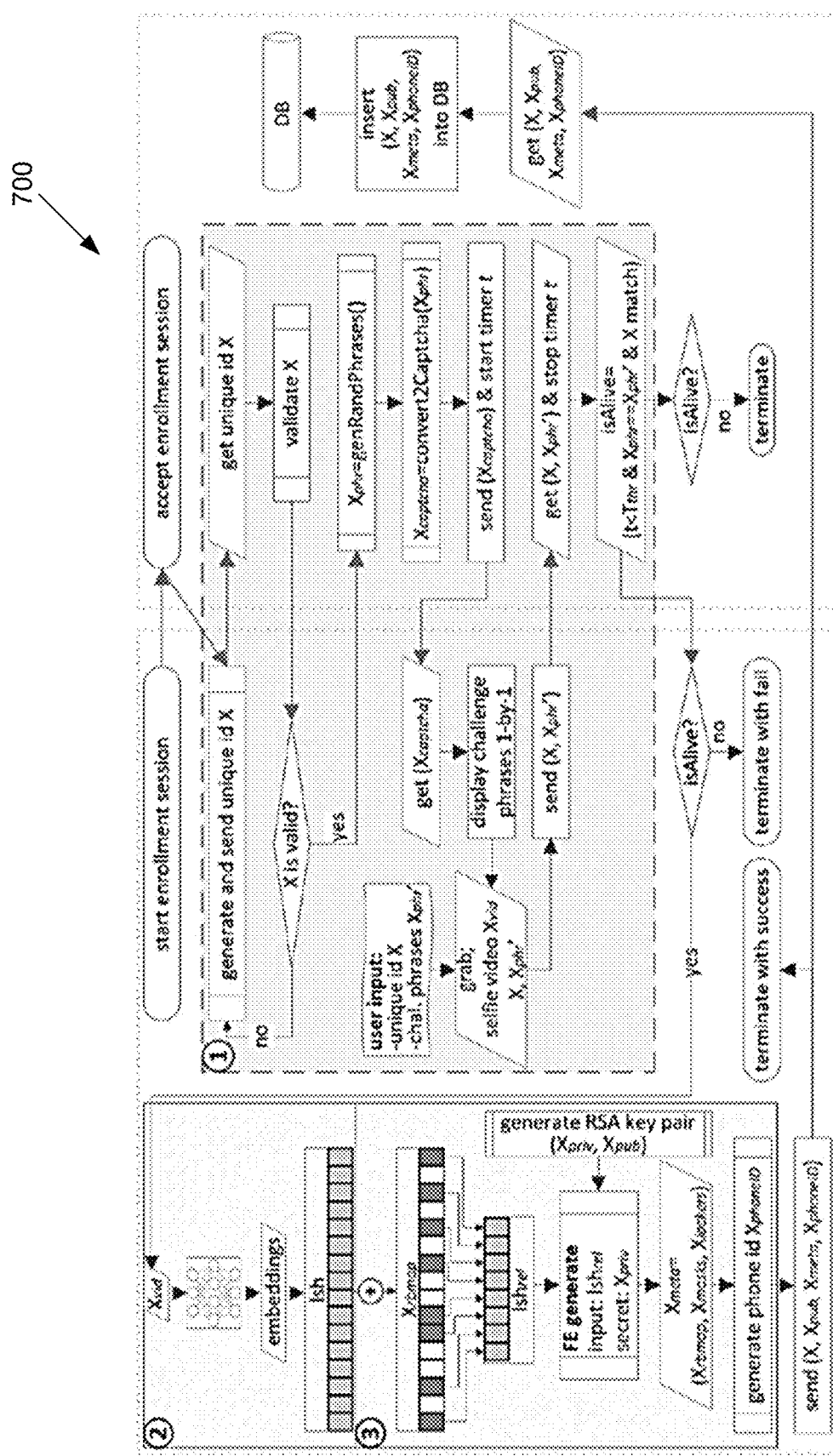
FIG. 7 is a drawing of an enrollment process according to various examples of the present disclosure.

FIG. 7 is a drawing of an enrollment process 700 according to examples of the disclosure. FIG. 7 depicts that the authentication application 251 can send a request to start an enrollment session. The authentication service 215 can receive the request sent by the authentication application 251 and cause the authentication application 251 to generate and send a unique ID X, which is received by the authentication service 215. The authentication service 215 can validate X. If the authentication service 215 determines that X is valid, the authentication service 215 can cause the liveness detection service 218 to generate one or more random phrases ($X_{phr}$) and convert the $X_{phr}$ to a CAPTCHA ($X_{captcha}$), which the authentication service 215 and/or the liveness detection service 218 can send to the client device 206.

The authentication application 251 can receive the $X_{captcha}$ and render a display of one or more challenges phrases associated with the $X_{captcha}$ The authentication application 251 can cause the camera system 254 to record a video ($X_{vid}$) that includes audio of a response to the $X_{captcha}$, which can include the user speaking the one or more random phrases upon which $X_{captcha}$ is based. The authentication application 251 can use speech-to-text to extract the solution in plaintext ($X_{phr}'$) that is based on the audio from the video. The authentication service 215 can then receive the unique ID (X) and $X_{phr}'$ and determine whether to proceed with the enrollment session. For example, the authentication service 215 and/or the liveness detection service 218 can determine whether the one or more text values of $X_{phr}'$ are equal to random phrases $X_{phr}$ sent to the client device 206. The system 200 can also include determining whether the time (t) between sending $X_{captcha}$ and receiving $X_{phr}'$ is less than a threshold ($T_{thr}$).

If the authentication service 215 and/or the liveness detection service determines that the response indicates that the user is alive, the authentication service 215 can proceed with enrollment. The authentication service 215 can cause the authentication application 251 to output embeddings in a non-Hamming distance space (e.g., Euclidean distance, cosine similarity, or L1 distance) that are based on $X_{vid}$.

The process 700 also depicts that the authentication application 251 can cause the key generator 260 to create a public key ($X_{pub}$) and a private key ($X_{priv}$). The authentication application 251 can apply computational reusable fuzzy extractor to create metadata 221 ($X_{meta}$) that includes masks 236 ($X_{masks}$) and the lockers ($X_{lockers}$) The metadata 221 ($X_{meta}$) can also include the reliable bit map ($X_{rbmap}$).

The process 700 also shows the authentication application 251 generating a phone ID ($X_{phoneID}$) of the client device 206. The authentication service 215 can use the phone ID ($X_{phoneID}$) to determine that the client device 206 is enrolled and associated with a user, so that the authentication service 215 can use the liveness detection service 218 during enrollment and recovery, but does not need to execute the liveness detection service 218 to authenticate the user. As indicated, the authentication application 251 can send the unique ID (X), the public key ($X_{pub}$), the metadata 221 ($X_{meta}$), and the phone ID ($X_{phoneID}$) to the authentication service 215. Thereafter, the process 700 proceeds to completion.

Figure 8:
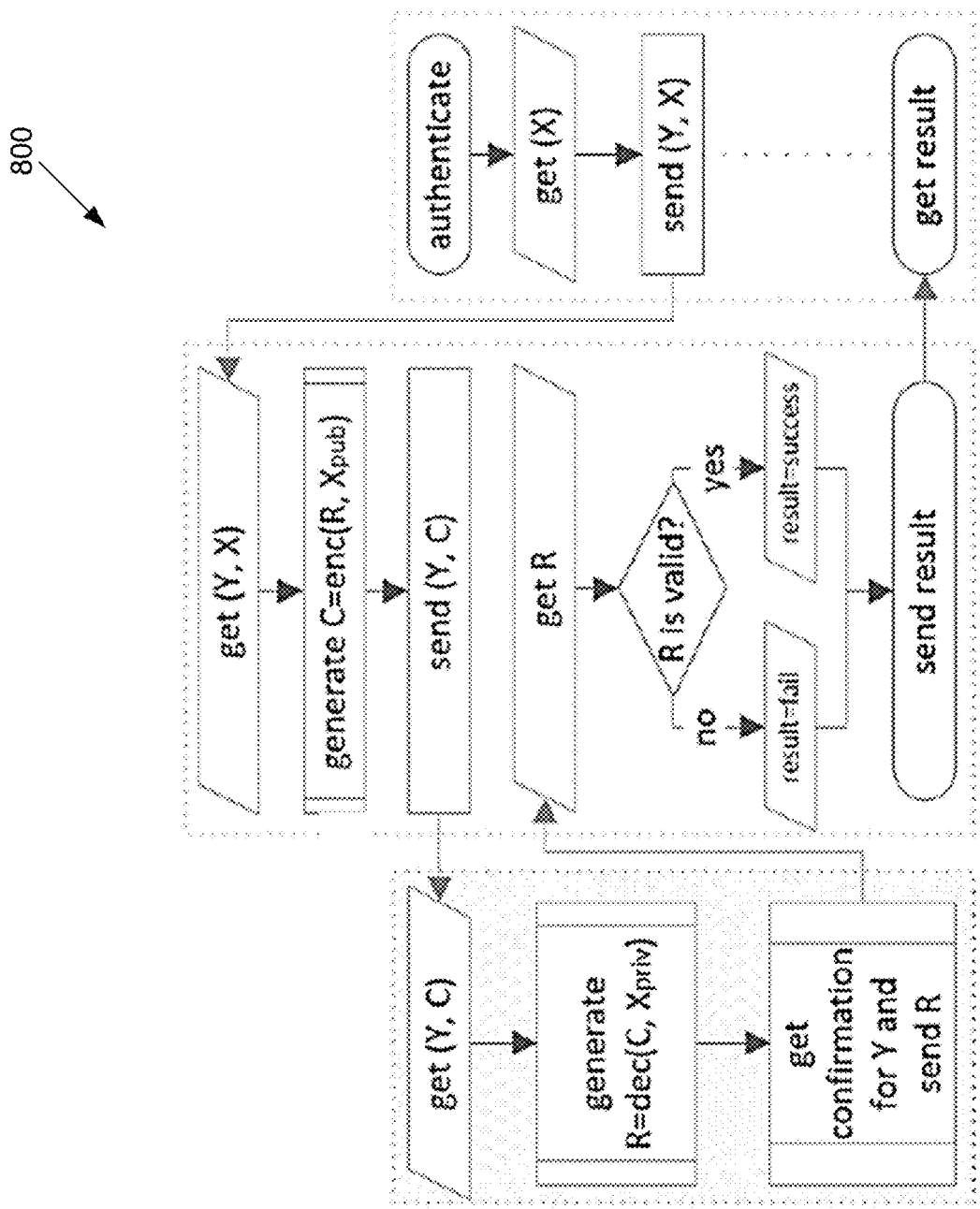
FIG. 8 is a drawing of an authentication process according to various examples of the present disclosure.

FIG. 8 is a drawing of an authentication process 800 according to examples of the disclosure. The process 800 depicts interactions between the authentication service 215, the authentication application 251, and a network site conforming to an OpenID protocol. As depicted, the authentication service 215 can receive (or get) (Y, X) sent by the network site. The authentication service 215 can generate C by encrypting a response (R) using a key ($X_{pub}$). The authentication service 215 can send a message to the authentication application 251. The message can include C and another value (Y). In response to receiving the message, the authentication application 251 can generate R by decrypting at least a portion of the message by using the private key ($X_{priv}$) that is encrypted in one or more of the lockers 233 as one of the secrets 239.

As can be appreciated, the process 800 can involve authentication embeddings such as those created by the authentication application 251 causing FaceNet to turn an input (image or a video) captured by the camera system 254 into 128 dimension, 128-byte vectors mapped in Euclidean space. By the nature of the present system being accurate, the authentication embeddings will be close to the enrollment embeddings if the input is of the same user. By the privacy properties of the present system, only authentication embeddings within a threshold will be able to open the lockers 233 and retrieve the private key ($X_{priv}$) stored therein as one of secrets 239. Thus, the user can prove his or her identity to the authentication service 215 (or establish a secure session) by using the secret 239 contained within the lockers 233.

The process 800 continues to show that the authentication application 251 can get confirmation for Y, and send R to the authentication service 215. Upon receipt of R, the authentication service 215 can determine whether R is valid. If R is valid, the authentication service 215 can send a positive result to the network site and thereby cause access to a resource to be granted. If R is not valid, the authentication service 215 can send a negative result to the OpenID server, or refrain from sending a result to the network site. Thereafter, the process 800 proceeds to completion.

Figure 9:
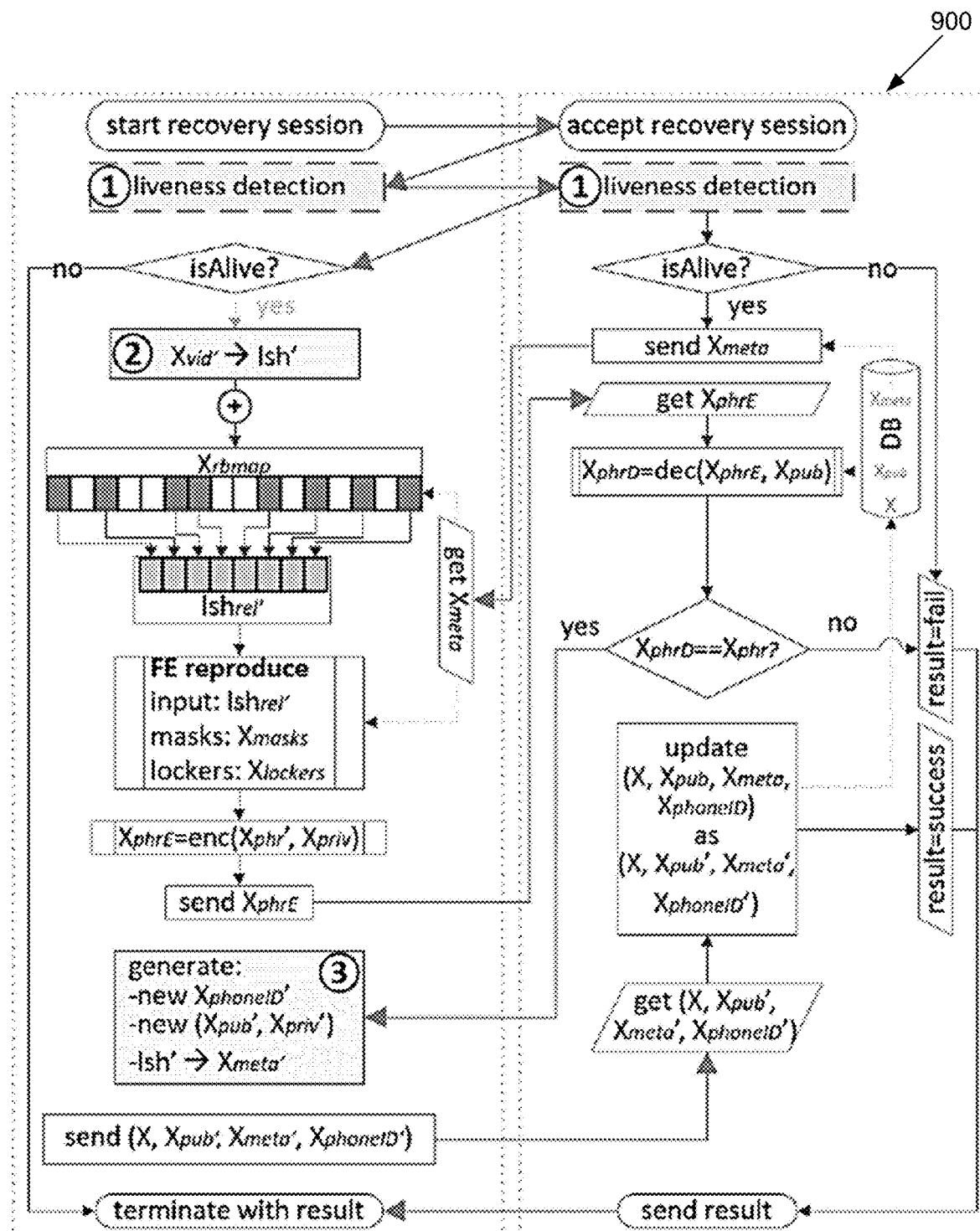
FIG. 9 is a drawing of a recovery process according to various examples of the present disclosure.

FIG. 9 is a drawing of a recovery process 900 according to examples of the disclosure. FIG. 9 depicts that the authentication application 251 can send a request to start an enrollment session. The authentication service 215 can cause the liveness detection service 218 to perform liveness detection based on an embedding generated by the client device 206. For example, the authentication application 251 can capture a new video $X_{vid}$, scan a face, extract embeddings, and generate LSHs ($X_{lsh'}$). If the liveness detection service 218 indicates that the embeddings show that the user is alive, the authentication service 215 can send metadata 221 $X_{meta}$, which can include masks 236 $X_{masks}$, lockers 233 $X_{lockers}$, and personal bit map 238 $X_{rbmap}$, to the authentication application 251. The authentication application 251 can mask the $X_{lsh'}$ with the $X_{rbmap}$ (or, can mask with the intersection of $X_{rbmap}$ and $X_{rbmap}'$) to eliminate unreliable bits, and, generate $lsh_{rel}$. The fuzzy extractor gets the $lsh_{rel}$ and $X_{masks}$ to generate $X_{lshm'}$ which reproduces the secret 239 $X_{priv}$.

The authentication application 251 encrypts $X_{phr}$ using $X_{priv}$ and generates $X_{phrE}$, which is sent to the authentication service 215. The authentication service 215 decrypts $X_{phr}$ using $X_{pub}$, and compares $X_{phr}$ with $X_{phrd}$ to determine whether the values are equal. If the values are equal, the authentication service 215 can cause the authentication application 251 to generate a new phone ID ($X_{phoneID}'$), new public key ($X_{pub}'$), and new private key ($X_{priv}'$). The authentication application 251 can also leverage $X_{lshm'}$ to generate new metadata ($X_{meta}'$). The authentication application 251 can send to the authentication service 215 the unique ID X, the new public key ($X_{pub}'$), the new metadata ($X_{meta}'$), and/or the new phone ID ($X_{phoneID}'$).

The authentication service 215 can store the unique ID X, the new public key ($X_{pub}'$), the new metadata ($X_{meta}'$) and/or the new phone ID ($X_{phoneID}'$) in the data store 212.

Thereafter, the process 900 proceeds to completion. The aforementioned process 900 can also be used for direct re-authentication of a user, as can be appreciated.

FIG. 10 depicts a table showing hyper-parameters for face and voice biometric. For parameter fine tuning of the privacy preserving face pipeline, the system can use a custom dataset of 360 constrained facial images from 20 people. For data collection, the system can use authentication application 251 to collect faces while checking the image brightness, head posture and client device 206 orientation to collect facial images with good lighting and quality with users directly facing the client device 206.

Evaluation dataset: the system can use a standard benchmark dataset from the face recognition community: You-Tube Faces (YTF). It contains noisy collections of unconstrained faces in video format belonging to 1,595 public figures. The system can extract up to 100 random frames for each identity.

Since YTF is a noisy and unconstrained dataset, it does not evaluate the system under conditions considered to be fair. In particular, since enrollment is performed once, it is reasonable to require proper lighting with the user directly facing the camera. For comparison, it would be absurd to wear sunglasses and look away from the camera for a driver's license photo. Thus, to have a more realistic large scale evaluation, the system can filter noisy images from the dataset.

The system can fine tune the parameters described in FIG. 10, in the order of length of LSH inputs of FE ($L_{lsh}$), masking prob. of unreliable bits ($P_{rmsk}$), num. of biometric scans per-person ($S_{sam}$), length of randomly-subsampled LSH inputs of FE ($L_{sub}$), and Hamming distance threshold of LSH inputs to unlock locker in FE ($HD_{thr}$) to optimize the performance and accuracy of the pipeline.

FIG. 11 is a table showing results of face/voice verification networks for optimized and best Euclidean distance thresholds. Accuracy of the baseline biometric systems for fixed and optimized Euclidean Distance thresholds ($ED_{thr}$) in FIG. 11. For fairness, the system can use fixed FaceNet parameters that satisfy industry level biometric requirements (FRR under 5% and FAR under 0.002%) across datasets. By comparison, the present system and method achieves better overall accuracy across datasets with the fixed hyper-parameters presented in FIG. 12.

Turning now to FIG. 12, shown is a table showing results for different datasets. FIG. 12 summarizes the execution times for enrollment and recovery, number of masks (k) for the FE, empirical error rates and theoretical adversary capabilities. According to results, the system and methods achieves (0.16% FRR, 0.00% FAR) on the clean YTF dataset. Moreover, the values in FIG. 11 and FIG. 12 show the present system decreased error rates compared to the original baseline systems due to the additional error correction in its pipeline. For both baseline and the present disclosure, authenticating voices is more challenging than faces.

One way of decreasing the error is to leverage multiple readings of a biometric. Since the system can capture video with audio, it makes sense for us to consider face and voice for authentication. Furthermore, as has been shown, the present system is flexible enough to incorporate multiple deep learning models (e.g. FaceNet and DeepSpeaker for face and voice). Possibilities for how to combine biometrics include: 1) combining LSH inputs and/or 2) applying logical disjunction on FE results from multiple readings. Both possibilities were evaluated. Since disjunction reduces FRR while increasing FAR, the system can decrease $HD_{thr}$ to counteract. Specifically, the system can keep the FAR of a single scan under one percent. Results achieve (1.52%, 0.195%) for (FRR, FAR) when $HD_{thr}=2$ using three trials and combining three LSH inputs at each trial.

Multiple biometrics can be combined to increase authentication security. For example, client device 206 can leverage biometric data collected from multiple sensors. When used properly, combined biometrics can improve security and reduce false acceptance. However, some sources and models are better than others. With this in mind, the system can ensemble a stronger biometric model with a weaker one to significantly reduce FAR while keeping FRR tolerable.

Methodology: For combined biometrics, the system can measure FRR and FAR accordingly:

$$FRR_E = FRR_F + TAR_F \times FRR_V$$

$$FAR_E = FAR_F \times FAR_V \qquad (2)$$

$TAR_F$ refers to the true acceptance rate on facial data. ($FRR_E$, $FAR_E$), ($FRR_F$, $FAR_F$) and ($FRR_V$, $FAR_V$) denote ensemble, face and voice model-based authentication error rates, respectively. As inferred from the equations, voice is verified after accepting face. If the voice is also accepted, then the system can consider the pair of biometrics to belong to the same person. Otherwise, it is considered to be a different person.

For evaluation, the system can randomly assign each identity from LibriSpeech to a facial identity from the other datasets. Since the system can capture audio for liveness detection, using both biometrics incurs no additional inconvenience to the user.

Results: The present systems and methods achieve (1.68%, 0%) of (FRR, FAR) on LibriSpeech when combined with the clean YTF dataset. The system can also evaluate the ensemble model with the original noisy YTF dataset to further show the impact of using additional biometrics on FAR. The system achieves (3.75%, 0.0061%) error compared to (2.26%, 3.13%) for face only. Overall, this demonstrates that combining multiple biometrics maintains zero (or almost zero) false acceptance, even with noisy data points. In summary, by using multiple biometrics, the system can achieve zero false acceptance across a large number of users. The following subsection presents the impact of ensemble modeling on the security against offline attacks.

Privacy guarantee of the system derives from that of the original FE system of R. Canetti et al. Recall, in the FE notation, lockers are the helper data; each is an encryption of a key R under a hash function modeled as a random oracle (RO). By the RO assumption, an adversary is unable to glean any information stored in lockers, beyond guessing a locker's key and attempting decryption. Keylength of the lockers' keys can be 64 bits. Because entropy of the biometric is much smaller than this, attacker will not attempt to search the full keyspace, but rather search the biometric space. Again, because lockers only allow to check for equality, checking a sample "close" to the enrolled one (but not close enough for recovery) is indistinguishable from checking any other sample. As a result, no kind of greedy/gradient descent search is possible; only brute force search.

Recall the pipeline: the system can start with a biometric, apply ML model, LSH, and finally FE. While there is no (computational) entropy loss in the FE application as argued above, there may be entropy loss in ML and LSH stages. Rather than estimating the post-LSH entropy, the system can analyze the FAR of the entire system and base estimates on this.

As has been mentioned, there is no universally accepted definition or metric for security in the context of biometric authentication systems. For security evaluation, the system can assume the attacker has a large database of face and voice samples to help guide brute forcing or impersonation. This approach additionally allows us to avoid the assumption that the FE masking does not reduce entropy. The system can measure the "security" of the system as the chance of false acceptance when a random face/voice sample is used to impersonate a user. This is different from a FAR based on using a limited number of illegitimate samples to attempt impersonation for each identity.

Note that while the system can measure the entropy of real human faces/voices, or at least measure the entropy of embeddings from FaceNet and DeepSpeaker, this can yield an upper bound of the security provided by the present system because ML model and LSH may incur entropy loss.

Instead, to measure the security against an attacker trying to impersonate users in a target dataset Tar using samples from an impostor set Imp, the system can take a more direct approach inspired by J. Daugman, "How iris recognition works," In The essential guide to image processing, pages 715-739. Elsevier, 2009. Let $\ell$ be the optimal value of $L_{sub}$ (subsampled bits in FE) for the Tar dataset. For k different sets of $\ell$ random bits, extract the corresponding $\ell$ bit keys from all samples in both Tar and Imp. Call the resulting set of keys Key($\ell$, Tar) and Key($\ell$, Imp) and the i-th and j-th keys in both sets Key($\ell$, Tar, i) and Key($\ell$, Imp, j), respectively. For all values of ($\ell$, i, j) denoting different identities, compute the Hamming distance between Key($\ell$, Tar, i) and Key($\ell$, Imp, j).

For an evaluation, the system can test the following (Tar, Imp) pairs: (clean YTF, clean YTF), (clean YTF, Imp Real) and (clean YTF, ImpSynt). The system can first evaluate the clean YTF dataset because its faces pass the filtering criteria. From there, the system can conduct an impostor attack with the largest publicly available datasets of real people without considering any of the quality requirements. However, public datasets only contain identities on the scale of thousands. To further empower an adversary, the system can leverage a state-of-the art face generation GAN to continuously create high fidelity impostor faces for two weeks, yielding almost two million identities. In all cases, the system can plot the fractional Hamming distances (e.g., normalized Hamming distance over key length, $\ell$) against the probability of having key pairs at that distance to closely fit an ideal binomial distribution.

It can be known that if the system can model the Hamming distance between genuine and impostor keys as a binomial distribution with degrees of freedom N, each attempt of cracking one locker with an impostor sample can be seen as N Bernoulli trials, with the probability of having the fractional Hamming distance between the two keys being x=n/N (e.g., n out of the N Bernoulli trials is a match) as:

$$f(x) = \frac{N!}{n!(N-n)!}\mu^n(1-\mu)^{(N-n)} \quad (3)$$

Since the impostor key must be an exact match (x=n=0) to crack the locker, the probability of the attacker using one sample from the Imp dataset to unlock one locker generated by the Tar dataset is: $F(0)=(1-\mu)^N$. If the FE generates k lockers for each user, the chance of an attacker using a random sample from Imp to extract the secret (e.g., unlocking one or more of the k lockers) of a user in Tar is:

$$F_k(0)=1-[1-F(0)]^k \quad (4)$$

By applying the FE parameters from FIG. 10 and FIG. 12, the success rate of the attacker for the (clean YTF, clean YTF) case is about $F_k(0)^{-1}=1$ in 16.8 million with 0.16% empirical FRR. Moreover, the Hamming distance distributions in FIG. 6, which represent the (clean YTF, ImpReal) and (clean YTF, ImpSynt) pairs, support this finding with zero attacker success after over 31 billion (Tar, Imp) comparisons from almost 2 million different impostors under the same settings shown in FIG. 10. In short, even after two weeks of GPU accelerated effort, the system cannot find any matching identities. If the system uses the ensemble model to authenticate users using both face and voice, the attack success rate for clean YTF combined with LibriSpeech for Tar and Imp is about $F_k(0)^{-1}=1$ in 8.62 billion with FRR of 1.68%. Finally, a point worth emphasizing is that the presented security evaluation empirically measures the strength of the FE output. Therefore, it already accounts for error correction and entropy loss caused by FaceNet and Deep-Speaker, LSH, eliminating unreliable LSH bits and FE itself.

A privacy preserving biometric authentication system has been presented. A privacy preserving component is built on top of the latest deep learning based facial and vocal recognition systems and the fuzzy extractor cryptographic construct. The system allows the back-end server to determine if two sets of encrypted biometric readings are from the same person, without ever having to decrypt the data. This privacy preserving authentication allows us to overcome the existing limitation of only using local authentication to avoid the privacy concerns of having databases full of plaintext user biometric data. Furthermore, the system can use live biometrics to defeat threats from stolen biometric data, which plagues all existing biometric systems, even ones with liveness detection. Experiments showed that the system has 100% of empirical accuracy on 360 facial images collected from 20 real users, (0.16%, 0.00%) of empirical (FRR, FAR) with around 1 in 17 million of a theoretical FE unlocking chance on a cleaned version of the YTF dataset and (1.68%, 0.00%) of empirical (FRR, FAR) with around 1 in 8.6 billion of a theoretical FE unlocking chance on ensembled-authentication pipeline. Moreover, two weeks of synthetic face generation along with using largest public datasets to unlock a single FE of clean YTF subjects ended up with zero success after trying 2 million of different impostors.

Next, detailed results of a step-by-step hyperparameter search is presented. FIG. 13 is a table showing results of how various parameters change across different lengths of Local-ity-Sensitive Hashes (LSH). FIG. 13 presents how false rejections and the HD threshold ($HD_{thr}$) giving zero (or close to zero) FAR change across different lengths of LSH. Considering the trend in degrees of freedom (N) and statistical distance (DP) along with FRR, the system obtained best result with $L_{lsh}$=256 bits. Although the required $HD_{thr}$ is beyond a tolerable limit (12 bits), the system can accept this level since the following optimization could decrease this threshold.

FIG. 14 is a table showing results of how various parameters change across different probability ratios for masking unreliable bits at LSH of 256 bits according to examples of the disclosure. FIG. 14 shows how false rejections, $HD_{thr}$ and degrees of freedom (N) change across different probability ratios for masking unreliable bits at $L_{lsh}$=256 bits. The table also shows the number of masked bits ($L_{msk}$) at each probability ratio. Results show that probability to mask unreliable bits ($P_{rmsk}$)=0.9 is the point the system obtained zero errors and lowest HD threshold level to achieve this. On the other hand, the system can also consider $P_{rmsk}$=0.7 for different datasets since it has zero errors too.

FIG. 15 is a table showing results of how various parameters change across different number of facial samples per subject at LSH of 256 bits according to examples of the disclosure. FIG. 15 shows how FRR, $HD_{thr}$ and N change across different number of facial samples per subject at $L_{lsh}$=256 bits, $P_{rmsk}$=0.9 and FAR=0% settings. As presented in the table, the disclosed system achieves zero errors and lowest HD threshold level with $S_{sam}$=9.

FIG. 16 is a table showing results of how number of subsampled bits affects degrees of freedom according to examples of the disclosure. FIG. 16 shows an optimal $S_{sam}$ for $L_{lsh}$=256, $P_{rmsk}$=0.9 and FAR=0%.

FIG. 17 is a table showing results of how various parameters change across Hamming Distance (HD) thresholds between 0 and 12 bits according to examples of the disclosure. FIG. 17 shows how number of subsampled bits ($L_{sub}$) affects degrees of freedom N. The mean ($\mu$) and the standard deviation ($\sigma$) of the distributions along with the statistical distance (DP) to theoretical Binomial model curve f(x) with the same mean and standard deviations are also presented. FIG. 17 shows an optimal $L_{sub}$ for $L_{lsh}$=256 and $P_{rmsk}$=0.9.

According to these results, the system starts getting higher degrees of freedom and small statistical distance around $L_{sub}$=48 bits. Smaller or bigger values could also be picked depending on the noise level of the data. Hence, the system keeps the $L_{sub}$ margin flexible around 64 bits.

FIG. 17 shows more details on how different thresholds effect execution time on both enrollment and recovery, number of masks in fuzzy extractor, error rates of end-to-end (including fuzzy extractor) pipeline. Overall, results show that after $HD_{thr}$=2 bits, the system achieves zero false rejections. However, considering larger, noisier and more diverse datasets, it could be better to pick a larger threshold for an optimal performance, accuracy and usability trade-off. Hence, the system can set $HD_{thr}$=7 bits since it gives zero errors for a clean dataset. Furthermore, the system can update this threshold also for datasets at different noise level or data type (e.g. voice). FIG. 17 shows an optimal $HD_{thr}$ with $L_{lsh}$=256, $L_{sub}$=64 and $P_{rmsk}$=0.9, and $S_{sam}$=9 for end-to-end system.

FIG. 18 is a table showing results of various trials according to examples of the disclosure. FIG. 18 shows an optimal number of LSH concatenation and disjunction at $L_{lsh}$=256, $L_{sub}$=64 and $P_{rmsk}$=0.9 and $HD_{thr}$=2 for end-to-end system on LibriSpeech dataset. FIG. 18 also presents how error rates change across different number of LSH concatenation and disjunction with other optimized settings of $L_{lsh}=256$, $L_{sub}=64$ and $P_{rmsk}=0.9$ for LibriSpeech dataset through end-to-end system. Results show the system can achieve (1.52%, 0.20%) of (FRR, FAR) if the system applies three disjunctions on subsampled-then-concatenated inputs from three LSHs, which means using all of $S_{sam}=9$ samples instead of picking one of them.

The flowcharts of FIGS. 3-9 show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts and sequence diagram show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The computing environment 203 and the client devices 206 or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the authentication application 251 and/or other components can be stored in one or more storage devices and be executable by one or more processors. Also, a data store can be stored in the one or more storage devices.

The authentication application 251, authentication service 215, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

As used herein, "about," "approximately," and the like, when used in connection with a numerical variable, can generally refers to the value of the variable and to all values of the variable that are within the experimental error (e.g., within the 95% confidence interval for the mean) or within +/−10% of the indicated value, whichever is greater.

Where a range of values is provided, it is understood that each intervening value and intervening range of values, to the tenth of the unit of the lower limit unless the context clearly dictates otherwise, between the upper and lower limit of that range and any other stated or intervening value in that stated range, is encompassed within the disclosure. The upper and lower limits of these smaller ranges may independently be included in the smaller ranges and are also encompassed within the disclosure, subject to any specifically excluded limit in the stated range. Where the stated range includes one or both of the limits, ranges excluding either or both of those included limits are also included in the disclosure.

In addition to the forgoing, any one or more of the examples of the present disclosure can include, but are not limited to, the embodiments set forth in the following clauses.

Clause 1. A system for biometric-based user identification, comprising: a client device comprising a processor; and an application executed by the processor, wherein the application causes the client device to at least: initiate generation of an embedding comprising a biometric data embedding in a non-Hamming distance space; and process the embedding to create a processed embedding and at least one operator that can be used for mapping the non-Hamming distance space to a Hamming distance space.

Clause 2. The system of clause 1, wherein the application further causes the client device to at least: start an enrollment session to enroll a user; and create a set of masks and a set of lockers based at least in part on using the at least one operator and a computational reusable fuzzy extractor, wherein at least one of: a secret or a cryptographic key is encrypted in at least one of the set of lockers.

Clause 3. The system of any one of clauses 1 and 2, wherein the application further causes the client device to at least: send metadata to a computing device over a network, the metadata comprising the set of lockers, the set of masks, and a personal reliable bit map.

Clause 4. The system of any one of clauses 1-3, wherein the at least one operator comprises at least one of: Locality Sensitive Hashes (LSHs) or a different error correcting mechanism.

Clause 5. The system of any one of clauses 1-4, wherein the non-Hamming distance space is a Euclidean space.

Clause 6. The system of any one of clauses 1-5, wherein the application further causes the client device to at least: generate at least one of: a secret or a cryptographic key; and send at least one of: the at least one of the secret or the cryptographic key, or a second cryptographic key to a computing device over a network.

Clause 7. The system of any one of clauses 1-6, wherein the application further causes the client device to at least: start an authentication session to verify the at least one of: the secret or the cryptographic key; and determine whether applying a set of masks to the processed embedding extracts the at least one of: the secret or the cryptographic key, wherein the at least one of: the secret or the cryptographic key is encrypted in at least one of a set of lockers, wherein the set of masks and the set of lockers are based at least in part on using a computational reusable fuzzy extractor and the at least one operator.

Clause 8. The system of any one of clauses 1-7, wherein the application further causes the client device to at least: obtain a message sent by the computing device, wherein at least a portion of the message comprises an authentication data created using the at least one of: the secret or the cryptographic key; and in response to determining that applying the set of masks to the processed embedding extracts the at least one of: the secret or the cryptographic key, generate a response using the at least one of: the secret or the cryptographic key.

Clause 9. The system of any one of clauses 1-8, wherein the application further causes the client device to at least: start a recovery session to replace the at least one of: the secret or the cryptographic key; create a new personal reliable bit map, a new set of masks and a new set of lockers wherein the at least one of: the secret or the cryptographic key is encrypted in at least one of the set of lockers, wherein the new set of masks and the new set of lockers are based at least in part on using the at least one operator and the computational reusable fuzzy extractor; and send the new set of masks, the new set of lockers and the new personal reliable bit map to the computing device over the network.

Clause 10. The system of any one of clauses 1-9, wherein the application further causes the client device to at least: in response to receiving a request to perform a liveness challenge, capture at least one of a video or a voice; and wherein the embedding is based on the at least one of the video or the voice.

Clause 11. The system of any one of clauses 1-10, wherein the application further causes the client device to at least: perform a text extraction on the at least one of the video or the voice; and send the response to a computing device over a network for determining whether the response matches with the liveness challenge and determining whether the response arrives to the computing device within a defined threshold of time, wherein the response comprises the text extraction.

Clause 12. A method for biometric-based user identification, comprising: initiating generation of an embedding comprising a biometric data embedding in a non-Hamming distance space; and processing the embedding to create a processed embedding and at least one operator that can be used for mapping the non-Hamming distance space to a Hamming distance space.

Clause 13. The method of clause 12, further comprising: starting an enrollment session to enroll a user; and creating a set of masks and a set of lockers based at least in part on using the at least one operator and a computational reusable fuzzy extractor, wherein at least one of: a secret or a cryptographic key is encrypted in at least one of the set of lockers.

Clause 14. The method of any one of clauses 12 or 13, further comprising: sending metadata to a computing device over a network, the metadata comprising the set of lockers, the set of masks, and a personal reliable bit map.

Clause 15. The method of any one of clauses 12-14, wherein the at least one operator comprises at least one of: Locality Sensitive Hashes (LSHs) or a different error correcting mechanism.

Clause 16. The method of any one of clauses 12-15, further comprising: generating at least one of: a secret or a cryptographic key; and sending at least one of: the at least one of the secret or the cryptographic key, or a second cryptographic key to a computing device over a network.

Clause 17. The method of any one of clauses 12-16, further comprising: starting an authentication session to verify the at least one of: the secret or the cryptographic key; and determining whether applying a set of masks to the processed embedding extracts the at least one of: the secret or the cryptographic key, wherein the at least one of: the secret or the cryptographic key is encrypted in at least one of a set of lockers, wherein the set of masks and the set of lockers are based at least in part on using a computational reusable fuzzy extractor and the at least one operator.

Clause 18. The method of any one of clauses 12-17, further comprising: obtaining a message sent by the computing device, wherein at least a portion of the message comprises an authentication data created using the at least one of: the secret or the cryptographic key; and in response to determining that applying the set of masks to the processed embedding extracts the at least one of: the secret or the cryptographic key, generating a response using the at least one of: the secret or the cryptographic key.

Clause 19. The method of any one of clauses 12-18, further comprising: in response to receiving a request to perform a liveness challenge, capture at least one of a video or a voice; wherein the embedding is based on the at least one of the video or the voice; performing a text extraction on the at least one of the video or the voice; and sending the response to a computing device for determining whether the response matches with the liveness challenge and determining whether the response arrives to the computing device within a defined threshold of time, wherein the response comprises the text extraction.

Clause 20. A non-transitory computer-readable medium embodying a program executable for biometric-based user identification on a client device, wherein the program, when executed, causes the client device to at least: initiate generation of an embedding comprising a biometric data embedding in a non-Hamming distance space; and process the embedding to create at least one operator that can be used for mapping the non-Hamming distance space to a Hamming distance space.

Clause 21. The non-transitory computer-readable medium of clause 20, wherein the program further causes the client device to at least: start an enrollment session to enroll a user; and create a set of masks and a set of lockers based at least in part on using the at least one operator and a computational reusable fuzzy extractor, wherein at least one of: a secret or a cryptographic key is encrypted in at least one of the set of lockers.

Clause 22. The non-transitory computer-readable medium of any one of clauses 20 or 21, wherein the program further causes the client device to at least: send metadata to a computing device over a network, the metadata comprising the set of lockers, the set of masks, and a personal reliable bit map.

Clause 23. The non-transitory computer-readable medium of any one of clauses 20-22, wherein the at least one operator comprises at least one of: Locality Sensitive Hashes (LSHs) or a different error correcting mechanism.

Clause 24. The non-transitory computer-readable medium of any one of clauses 20-23, wherein the non-Hamming distance space is a Euclidean space.

Clause 25. The non-transitory computer-readable medium of any one of clauses 20-24, wherein the program further causes the client device to at least: generate at least one of: a secret or a cryptographic key; and send at least one of: the at least one of the secret or the cryptographic key, or a second cryptographic key to a computing device over a network.

Clause 26. The non-transitory computer-readable medium of any one of clauses 20-25, wherein the program further causes the client device to at least: start an authentication session to verify the at least one of: the secret or the cryptographic key; and determine whether applying a set of masks to the processed embedding extracts the at least one of: the secret or the cryptographic key, wherein the at least one of: the secret or the cryptographic key is encrypted in at least one of a set of lockers, wherein the set of masks and the set of lockers are based at least in part on using a computational reusable fuzzy extractor and the at least one operator.

Clause 27. The non-transitory computer-readable medium of any one of clauses 20-26, wherein the program further causes the client device to at least: obtain a message sent by the computing device, wherein at least a portion of the message comprises an authentication data created using the at least one of: the secret or the cryptographic key; and in response to determining that applying the set of masks to the processed embedding extracts the at least one of: the secret or the cryptographic key, generate a response using the at least one of: the secret or the cryptographic key.

Clause 28. The non-transitory computer-readable medium of any one of clauses 20-27, wherein the program further causes the client device to at least: start a recovery session to replace the at least one of: the secret or the cryptographic key; create a new personal reliable bit map, a new set of masks and a new set of lockers wherein the at least one of: the secret or the cryptographic key is encrypted in at least one of the set of lockers, wherein the new set of masks and the new set of lockers are based at least in part on using the at least one operator and the computational reusable fuzzy extractor; and send the new set of masks, the new set of lockers and the new personal reliable bit map to the computing device over the network.

Clause 29. The non-transitory computer-readable medium of any one of clauses 20-28, wherein the program further causes the client device to at least: in response to receiving a request to perform a liveness challenge, capture at least one of a video or a voice; and wherein the embedding is based on the at least one of the video or the voice.

Clause 30. The non-transitory computer-readable medium of any one of clauses 20-29, wherein the program further causes the client device to at least: perform a text extraction on the at least one of the video or the voice; and send the response to a computing device over a network for determining whether the response matches with the liveness challenge and determining whether the response arrives to the computing device within a defined threshold of time, wherein the response comprises the text extraction.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

The invention claimed is:

1. A system for biometric-based user identification, comprising:
   a client device comprising a processor; and
   an authentication application executed by the processor, wherein the application causes the client device to at least:
      capture biometric data from the client device for a generation of an embedding;
      generate a locality-sensitive hash (LSH) from the embedding;
      determine that a set of measurements of the LSH meet a distance threshold;
      generate a personal mask to identify a plurality of reliable bits based at least in part on the set of measurements of the locality sensitive hash meeting the threshold;
      generate a secret that includes a cryptographic key, the cryptographic key being configured for authentication of the client device with an authentication service;
      generate a masked locality-sensitive hash using a reusable fuzzy extractor based at least in part on the secret; and
      send metadata to the authorization service, the metadata comprising the masked locality-sensitive hash.

2. The system of claim 1, wherein the biometric data is captured using at least one of a camera or a microphone of the client device.

3. The system of claim 1, wherein the embedding is in a non-hamming distance space and the embedding is generated based at least in part on a plurality of facial scans of a user.

4. The system of claim 1, wherein the secret is generated using a key generator executed by the client device.

5. The system of claim 1, wherein generating the masked locality-sensitive hash further comprises generating a set of lockers that include the secret.

6. The system of claim 5, wherein sending the metadata to the authorization service further comprising sending the set of lockers and the personal mask to the authentication service.

7. The system of claim 1, wherein determining that the set of measurements of the locality sensitive hash meet the distance threshold further causes the client device to at least:
   eliminate a noisy LSH bit that shows a variation across at least two measurements of the set of measurements.

8. A method for biometric-based user identification, comprising:
   capturing, by a client device, biometric data for a generation of an embedding;
   generating, by the client device, a locality-sensitive hash (LSH) from the embedding;
   determine that a set of measurements of the locality sensitive hash meet a distance threshold;
   generate a personal mask to identify a plurality of reliable bits based at least in part on the set of measurements of the locality sensitive hash meeting the threshold;
   generate a secret that includes a cryptographic key, the cryptographic key being configured for authentication of the client device with an authentication service;
   generate a masked locality-sensitive hash using a reusable fuzzy extractor based at least in part on the secret; and send metadata to the authorization service, the metadata comprising the masked locality-sensitive hash.

9. The method of claim 8, wherein the biometric data is captured using at least one of a camera or a microphone of the client device.

10. The method of claim 8, wherein the embedding is in a non-hamming distance space.

11. The method of claim 8, wherein the secret is generated using a key generator executed by the client device.

12. The method of claim 8, wherein generating the masked locality-sensitive hash further comprises generating a set of lockers that include the secret.

13. The method of claim 12, wherein sending the metadata to the authorization service further comprising sending the set of lockers and the personal mask to the authentication service.

14. The method of claim 8, wherein determining that the set of measurements of the locality sensitive hash meet the distance threshold further causes the client device to at least:
eliminate a noisy LSH bit that shows a variation across at least two measurements of the set of measurements.

15. A non-transitory computer-readable medium embodying a program executable for biometric-based user identification on a client device, wherein the program, when executed, causes the client device to at least:
capture biometric data from the client device for a generation of an embedding;
generate a locality-sensitive hash (LSH) from the embedding;
determine that a set of measurements of the LSH meet a distance threshold;
generate a personal mask to identify a plurality of reliable bits based at least in part on the set of measurements of the locality sensitive hash meeting the threshold;
generate a secret that includes a cryptographic key, the cryptographic key being configured for authentication of the client device with an authentication service;
generate a masked locality-sensitive hash using a reusable fuzzy extractor based at least in part on the secret; and
send metadata to the authorization service, the metadata comprising the masked locality-sensitive hash.

16. The non-transitory computer-readable medium of claim 15, wherein the biometric data is captured using at least one of a camera or a microphone of the client device.

17. The non-transitory computer-readable medium of claim 15, wherein the embedding is in a non-hamming distance space.

18. The non-transitory computer-readable medium of claim 15, wherein the secret is generated using a key generator executed by the client device.

19. The non-transitory computer-readable medium of claim 15, wherein generating the masked locality-sensitive hash further comprises generating a set of lockers that include the secret.

20. The non-transitory computer-readable medium of claim 15, wherein sending the metadata to the authorization service further comprising sending the set of lockers and the personal mask to the authentication service.

* * * * *